United States Patent
Mizusaki et al.

(10) Patent No.: US 11,009,749 B2
(45) Date of Patent: May 18, 2021

(54) LIQUID CRYSTAL DISPLAY DEVICE AND METHOD FOR MANUFACTURING LIQUID CRYSTAL DISPLAY DEVICE

(71) Applicant: SHARP KABUSHIKI KAISHA, Sakai (JP)

(72) Inventors: Masanobu Mizusaki, Sakai (JP); Hiroshi Tsuchiya, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 531 days.

(21) Appl. No.: 16/065,280

(22) PCT Filed: Dec. 19, 2016

(86) PCT No.: PCT/JP2016/087699
§ 371 (c)(1),
(2) Date: Jun. 22, 2018

(87) PCT Pub. No.: WO2017/110704
PCT Pub. Date: Jun. 29, 2017

(65) Prior Publication Data
US 2021/0109409 A1    Apr. 15, 2021

(30) Foreign Application Priority Data

Dec. 25, 2015  (JP) ............... JP2015-254219

(51) Int. Cl.
*G02F 1/1337* (2006.01)
*G02F 1/1341* (2006.01)
(Continued)

(52) U.S. Cl.
CPC ...... *G02F 1/133711* (2013.01); *C08F 220/20* (2013.01); *C08F 220/36* (2013.01);
(Continued)

(58) Field of Classification Search
None
See application file for complete search history.

(56) References Cited

U.S. PATENT DOCUMENTS 9,499,649 B2 * 11/2016 Bury ............... G02B 5/305
2003/0118752 A1 * 6/2003 Choi ............... G02F 1/133788
428/1.26
(Continued)

FOREIGN PATENT DOCUMENTS

WO    2015/071976 A1    5/2015

*Primary Examiner* — Ryan Crockett
(74) *Attorney, Agent, or Firm* — ScienBiziP, P.C.

(57) ABSTRACT

The present invention provides a liquid crystal display device capable of maintaining a favorable voltage holding ratio and reducing occurrence of image sticking and stain and a decrease in contrast ratio in a high-temperature environment for a long time while including a photo-alignment film, and a method for manufacturing such a liquid crystal display device. The liquid crystal display device of the present invention includes paired substrates, a liquid crystal layer disposed between the substrates, a photo-alignment film disposed between at least one of the substrates and the liquid crystal layer, and a polymer layer disposed between the liquid crystal layer and the photo-alignment film. The photo-alignment film contains a polymer that contains a photo-reactive functional group. The polymer layer contains a polymer that has a structure derived from a specific polymerization initiator and a structure derived from a specific monomer.

18 Claims, 1 Drawing Sheet

(51) Int. Cl.
*C08F 220/20* (2006.01)
*C08F 220/36* (2006.01)

(52) U.S. Cl.
CPC ...... *G02F 1/1341* (2013.01); *G02F 1/133738* (2021.01); *G02F 1/133742* (2021.01); *G02F 1/133788* (2013.01); *G02F 2202/42* (2013.01)

(56) References Cited

U.S. PATENT DOCUMENTS

| | | | |
|---|---|---|---|
| 2005/0266177 A1* | 12/2005 | Sawatari | C09K 19/0225 428/1.2 |
| 2013/0010244 A1* | 1/2013 | Suwa | C09K 19/56 349/123 |
| 2013/0222740 A1* | 8/2013 | Miyachi | C09K 19/0225 349/89 |
| 2014/0162076 A1* | 6/2014 | Eckert | C09D 179/08 428/473.5 |
| 2014/0176888 A1* | 6/2014 | Hakoi | G02F 1/133711 349/123 |
| 2014/0249244 A1* | 9/2014 | Chappellet | C07F 7/1804 522/176 |
| 2014/0342086 A1* | 11/2014 | Ibn-Elhaj | G02F 1/133788 427/162 |
| 2016/0168465 A1* | 6/2016 | Mizusaki | C08F 222/36 349/123 |
| 2016/0244667 A1* | 8/2016 | Ono | G02F 1/1339 |
| 2019/0094421 A1* | 3/2019 | Ibuki | G02B 5/0294 |
| 2019/0292307 A1* | 9/2019 | Mizusaki | H01L 27/124 |

* cited by examiner

LIQUID CRYSTAL DISPLAY DEVICE AND METHOD FOR MANUFACTURING LIQUID CRYSTAL DISPLAY DEVICE

TECHNICAL FIELD

The present invention relates to liquid crystal display devices and methods for manufacturing a liquid crystal display device. More specifically, the present invention relates to a liquid crystal display device configured to control the alignment of liquid crystal molecules with a photo-alignment film and a method for manufacturing a liquid crystal display device.

BACKGROUND ART

Liquid crystal display devices are display devices utilizing a liquid crystal composition for display. The typical display mode thereof is irradiating a liquid crystal panel containing a liquid crystal composition sealed between paired substrates with backlight illumination and applying voltage to the liquid crystal composition to change the alignment of liquid crystal molecules, thereby controlling the amount of light passing through the liquid crystal panel. Such liquid crystal display devices have features including a thin profile, light weight, and low power consumption, and have therefore been used for electronic devices such as smartphones, tablet PCs, and car navigation systems. The pixel resolution has been increased for uses such as smartphones, which has led to a tendency of an increase in the number of conductive lines and the area of the black matrix disposed in the liquid crystal panel.

In a liquid crystal display device, the alignment of liquid crystal molecules with no voltage applied is typically controlled by alignment films on which an alignment treatment has been performed. The alignment treatment has conventionally been performed by the rubbing method of rubbing the surface of an alignment film with a tool such as a roller. However, since the number of the conductive lines and the area of the black matrix disposed in the liquid crystal panel have been increased, irregularities are now more likely to occur on the substrate surfaces in the liquid crystal panel. With irregularities on the substrate surfaces, the portions near the irregularities may not be properly rubbed by the rubbing method. Such a non-uniform alignment treatment may cause a decrease in the contrast ratio in the liquid crystal display device.

In order to deal with this problem, studies and development have been made on a photo-alignment method which is an alternative alignment treatment method to the rubbing method and irradiates the surface of an alignment film with light. With the photo-alignment method, an alignment treatment can be performed without contact with the surface of the alignment film. The photo-alignment method therefore has an advantage that an alignment treatment is less likely to be non-uniform even with irregularities on the substrate surfaces, so that a favorable liquid crystal alignment can be achieved on the entire substrates.

However, conventional liquid crystal display devices may suffer display defects such as image sticking and stain, and there is a need for reduction of such defects. For example, Patent Literature 1 aims to prevent a decrease in the voltage holding ratio (VHR) of a liquid crystal layer and an increase in the ion density (ID), which enables elimination of problematic defective display such as voids, uneven alignment, and screen burn-in, and thus discloses the use of a specific liquid crystal composition and a sealant containing a cured product of a specific curable resin composition.

CITATION LIST

Patent Literature
Patent Literature 1: WO 2015/071976

SUMMARY OF INVENTION

Technical Problem

As described above, conventional liquid crystal display devices may unfortunately suffer display defects such as image sticking and stain. In particular, a liquid crystal display device provided with a photo-alignment film containing photo-reactive functional groups (hereinafter, also referred to as a photo-alignment liquid crystal display) is likely to suffer image sticking and stain on the display screen. In particular, image sticking and stain easily occur when functional groups that absorb light with a wavelength of 360 nm or longer, such as azobenzene, chalcone, or cinnamate groups, are introduced as photo-reactive functional groups.

The present inventors performed various studies to consider that image sticking and stain seem to occur as follows in photo-alignment liquid crystal displays.

FIG. 1 is a schematic cross-sectional view of a liquid crystal display device according to Comparative Embodiment 1. As illustrated in FIG. 1, the liquid crystal display device according to Comparative Embodiment 1 is a photo-alignment liquid crystal display including paired substrates 10 and 20, a liquid crystal layer 30 disposed between the substrates 10 and 20, photo-alignment films 40 disposed between the liquid crystal layer 30 and the respective substrates 10 and 20, a seal 60 attaching the substrates 10 and 20, polarizers 70 attached to the respective substrates 10 and 20, and a backlight (not illustrated). The photo-alignment films 40 each contain a polymer that contains photo-reactive functional groups. When light (e.g., backlight illumination containing visible light and ultraviolet light) is applied to the photo-alignment films 40, photo-reactive functional groups (in particular, photo-reactive functional groups that absorb light with a wavelength of 360 nm or longer, such as azobenzene, chalcone, or cinnamate groups) are decomposed to generate radicals. For example, an azobenzene group generates radicals by absorbing light as follows.

[Chem. 1]

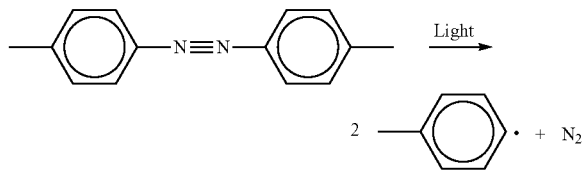

Some of the radicals generated are easily transferred to liquid crystal molecules in the liquid crystal layer 30. As the radicals transferred are finally ionized, the voltage holding ratio (hereinafter, also referred to as VHR) decreases and image sticking and/or stain occur(s). In general, when radicals are generated in a high-molecular-weight compound that is a constituent material of the alignment film, some of the radicals are transferred to negative liquid crystal molecules in the liquid crystal layer and/or neutral liquid crystal molecules (non-polar liquid crystal molecules) having an alkene structure, reducing the VHR. The point is that the radicals generated from the photo-reactive functional groups in the photo-alignment films are transferred to a liquid crystal material (in particular, a negative liquid crystal material) and finally ionized to reduce the VHR.

When a photo-alignment liquid crystal display is left in a high-temperature environment, the radicals in the photo-alignment film are easily dissolved in the liquid crystal layer, easily causing image sticking and stain due to reduction in VHR.

Further, when a photo-alignment liquid crystal display is left in a high-temperature environment for a long time, the contrast ratio may decrease in some cases. The cause of this seems to be transfer of radicals generated from the photo-alignment film to liquid crystal molecules and ionization thereof in the end.

The technique disclosed in Patent Literature 1 is intended to reduce display defects due to seal components and assumes typical alignment films. It still needs to be improved in order to reduce image sticking and stain due to the aforementioned photo-alignment film containing photo-reactive functional groups.

The present invention is made in view of the above state of the art, and aims to provide a liquid crystal display device capable of maintaining a favorable voltage holding ratio and reducing occurrence of image sticking and stain and a decrease in contrast ratio in a high-temperature environment for a long time while including a photo-alignment film, and a method for manufacturing such a liquid crystal display device.

Solution to Problem

With regard to a photo-alignment liquid crystal display, the present inventors focused on the fact that radicals generated from photo-reactive functional groups in a photo-alignment film are dissolved in a liquid crystal layer and finally ionized to reduce the VHR. The present inventors then performed studies to find that the above problems can successfully be solved by thermally polymerizing a specific monomer using a specific polymerization initiator and forming a polymer layer containing a polymer of this monomer between the liquid crystal layer and a photo-alignment film, thereby completing the present invention.

In other words, one aspect of the present invention may be a liquid crystal display device including: paired substrates; a liquid crystal layer disposed between the substrates; a photo-alignment film disposed between at least one of the substrates and the liquid crystal layer; and a polymer layer disposed between the liquid crystal layer and the photo-alignment film, the photo-alignment film containing a polymer that contains a photo-reactive functional group, the polymer layer containing a polymer that has a structure derived from a polymerization initiator represented by the following formula (1) and a structure derived from a monomer represented by the following formula (2),

[Chem. 2]

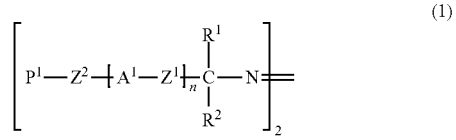

(1)

wherein $P^1$ is an acryloyloxy, methacryloyloxy, acryloylamino, methacryloylamino, vinyl, or vinyloxy group;

$Z^1$ and $Z^2$ are the same as or different from each other, and are each a —O—, —S—, —NH—, —CO—, —COO—, —OCO—, —NHCO—, —CONH—, —CH$_2$—, —CH(CH$_3$)—, —C(CH$_3$)$_2$—, —CF$_2$—, —C(OH)CO(CO)—, or —C(OH)C(HN)— group, or a direct bond;

$R^1$ and $R^2$ are the same as or different from each other, and are each a —H, —CH$_3$, —C$_2$H$_5$, —C$_3$H$_7$, —X (X is a halogen), —CN, —NH$_2$, —NH(CH$_3$), —N(CH$_3$)$_2$, —OH, —OCH$_3$, —OC$_2$H$_5$, or —OC$_3$H$_7$ group;

$A^1$ is a 1,4-phenylene, naphthalene-2,6-diyl, 1,4-cyclohexylene, or C1-C18 saturated or unsaturated alkylene group;

a —CH$_2$— group in $A^1$ may be replaced by a —O— group or a —S— group unless neighboring another one;

at least one hydrogen atom in $A^1$ may be replaced by a fluorine atom, a chlorine atom, a —CN group, or a C1-C6 alkyl, alkoxy, alkylcarbonyl, alkoxycarbonyl, or alkylcarbonyloxy group;

n is 0, 1, or 2; and when n is 2, the two $A^1$s on the same side of the azo group may be the same as or different from each other, and the two $Z^1$s on the same side of the azo group may be the same as or different from each other,

[Chem. 3]

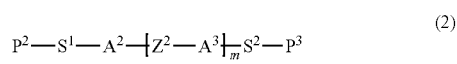

(2)

wherein $P^2$ and $P^3$ are the same as or different from each other, and are each an acryloyloxy, methacryloyloxy, acryloylamino, methacryloylamino, vinyl, or vinyloxy group;

$A^2$ and $A^3$ are the same as or different from each other, and are each a 1,4-phenylene, 4,4'-biphenyl, naphthalene-2,6-diyl, anthracene 2,6-diyl, or phenanthrene-2,7-diyl group;

$Z^2$ is a —COO—, —OCO—, —O—, —CO—, —NHCO—, —CONH—, or —S— group, or represents a direct bond between $A^2$ and $A^3$ or between $A^3$ and $A^3$;

m is 0, 1, or 2;

$S^1$ and $S^2$ are the same as or different from each other, and are each (CH$_2$)$_j$ (1≤j≤18) or (CH$_2$—CH$_2$—O)$_k$ (1≤k≤6), or represents a direct bond between $P^2$ and $A^2$, between $A^2$ and $P^3$, or between $A^3$ and $P^3$; and at least one hydrogen atom in $A^2$ and $A^3$ may be replaced by a halogen, methyl, or ethyl group.

The photo-reactive functional group may be an azobenzene, chalcone, or cinnamate group.

The polymer contained in the photo-alignment film may be a polyamic acid, a polyimide, a polysiloxane, a polyvinyl, or polymaleimide.

The polymer contained in the photo-alignment film may be coupled with the polymer contained in the polymer layer.

The photo-alignment film may substantially horizontally align liquid crystal molecules in the liquid crystal layer.

The photo-alignment film may substantially vertically align liquid crystal molecules in the liquid crystal layer.

The liquid crystal layer may contain a liquid crystal material having negative anisotropy of dielectric constant.

The alignment mode of the liquid crystal display device may be the twisted nematic (TN), electrically controlled birefringence (ECB), in-plane switching (IPS), fringe field switching (FFS), vertical alignment (VA), or twisted nematic vertical alignment (VATN) mode.

Another aspect of the present invention may be a method for manufacturing a liquid crystal display device, including: preparing paired substrates;

forming a photo-alignment film containing a polymer that contains a photo-reactive functional group on at least one of the substrates;

forming a liquid crystal layer between the substrates at least one of which is provided with the photo-alignment film; and thermally polymerizing a monomer represented by the following formula (2) using a polymerization initiator represented by the following formula (1) to form a polymer layer between the photo-alignment film and the liquid crystal layer,

[Chem. 4]

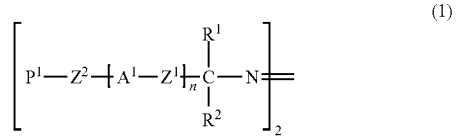

(1)

wherein $P^1$ is an acryloyloxy, methacryloyloxy, acryloylamino, methacryloylamino, vinyl, or vinyloxy group;

$Z^1$ and $Z^2$ are the same as or different from each other, and are each a —O—, —S—, —NH—, —CO—, —COO—, —OCO—, —NHCO—, —CONH—, —CH$_2$—, —CH(CH$_3$)—, —C(CH$_3$)$_2$—, —CF$_2$—, —C(OH)CO(CO)—, or —C(OH)C(HN)— group, or a direct bond;

$R^1$ and $R^2$ are the same as or different from each other, and are each a —H, —CH$_3$, —C$_2$H$_5$, —C$_3$H$_7$, —X (X is a halogen), —CN, —NH$_2$, —NH(CH$_3$), —N(CH$_3$)$_2$, —OH, —OCH$_3$, —OC$_2$H$_5$, or —OC$_3$H$_7$ group;

$A^1$ is a 1,4-phenylene, naphthalene-2,6-diyl, 1,4-cyclohexylene, or C1-C18 saturated or unsaturated alkylene group;

a —CH$_2$— group in $A^1$ may be replaced by a —O— group or a —S— group unless neighboring another one;

at least one hydrogen atom in $A^1$ may be replaced by a fluorine atom, a chlorine atom, a —CN group, or a C1-C6 alkyl, alkoxy, alkylcarbonyl, alkoxycarbonyl, or alkylcarbonyloxy group;

n is 0, 1, or 2; and when n is 2, the two $A^1$s on the same side of the azo group may be the same as or different from each other, and the two $Z^1$s on the same side of the azo group may be the same as or different from each other,

[Chem. 5]

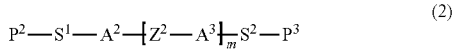

(2)

wherein $P^2$ and $P^3$ are the same as or different from each other, and are each an acryloyloxy, methacryloyloxy, acryloylamino, methacryloylamino, vinyl, or vinyloxy group;

$A^2$ and $A^3$ are the same as or different from each other, and are each a 1,4-phenylene, 4,4'-biphenyl, naphthalene-2,6-diyl, anthracene 2,6-diyl, or phenanthrene-2,7-diyl group;

$Z^2$ is a —COO—, —OCO—, —O—, —CO—, —NHCO—, —CONH—, or —S— group, or represents a direct bond between $A^2$ and $A^3$ or between $A^3$ and $A^3$;

m is 0, 1, or 2;

$S^1$ and $S^2$ are the same as or different from each other, and are each (CH$_2$) (1≤j≤18) or (CH$_2$—CH$_2$—O)$_k$ (1≤k≤6), or represents a direct bond between $P^2$ and $A^2$, between $A^2$ and $P^3$, or between $A^3$ and $P^3$; and at least one hydrogen atom in $A^2$ and $A^3$ may be replaced by a halogen, methyl, or ethyl group.

The thermal polymerization may be performed at a temperature that is not lower than the radical-generating temperature of the polymerization initiator but lower than the nematic-isotropic transition temperature of a liquid crystal material in the liquid crystal layer.

In forming the photo-alignment film, the photo-alignment film may be irradiated with polarized ultraviolet light.

The photo-reactive functional group may be an azobenzene, chalcone, or cinnamate group.

The polymer contained in the photo-alignment film may be a polyamic acid, a polyimide, a polysiloxane, a polyvinyl, or polymaleimide.

The polymer contained in the photo-alignment film and the polymer contained in the polymer layer may be coupled with each other by photo-irradiation and/or heat.

The photo-alignment film may substantially horizontally align liquid crystal molecules in the liquid crystal layer by polarized light irradiation.

The photo-alignment film may substantially vertically align liquid crystal molecules in the liquid crystal layer by polarized light irradiation.

The liquid crystal layer may contain a liquid crystal material having negative anisotropy of dielectric constant.

The alignment mode of the liquid crystal display device may be the twisted nematic (TN), electrically controlled birefringence (ECB), in-plane switching (IPS), fringe field switching (FFS), vertical alignment (VA), or twisted nematic vertical alignment (VATN) mode.

The above features of the present invention may appropriately be combined within the scope of the present invention.

Advantageous Effects of Invention

The liquid crystal display device of the present invention according to the above features includes a photo-alignment film containing a polymer that contains a photo-reactive functional group, as well as the aforementioned polymer layer between the liquid crystal layer and the photo-alignment film. Thus, the liquid crystal display device is capable of maintaining a favorable voltage holding ratio and reducing generation of image sticking and stain and a decrease in contrast ratio in a high-temperature environment for a long time.

The method for manufacturing a liquid crystal display device of the present invention according to the above features includes forming a photo-alignment film containing a polymer that contains a photo-reactive functional group, as well as forming the aforementioned polymer layer between the photo-alignment film and the liquid crystal layer by thermal polymerization. Thus, the method can provide a liquid crystal display device capable of maintaining a favorable voltage holding ratio and reducing generation of image sticking and stain and a decrease in contrast ratio in a high-temperature environment for a long time.

DESCRIPTION OF EMBODIMENTS

Hereinafter, an embodiment of the present invention is described. The contents of the following embodiment are not intended to limit the scope of the present invention, and the design may appropriately be changed within the spirit of the configuration of the present invention.

<Liquid Crystal Display Device>

First, a liquid crystal display device of the present embodiment is described.

Figure 1:
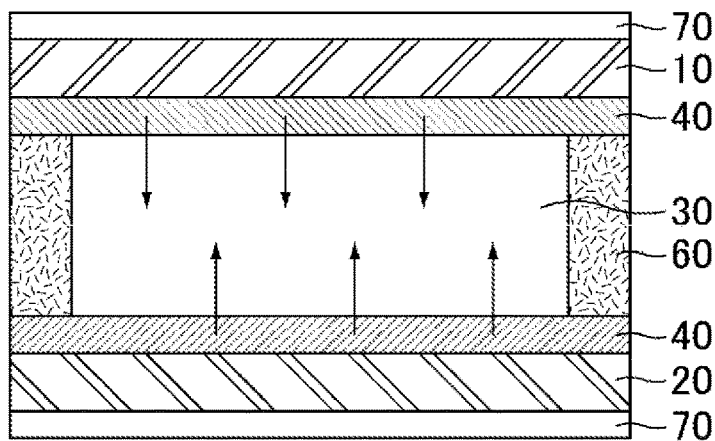
FIG. 1 is a schematic cross-sectional view of a liquid crystal display device according to Comparative Embodiment 1.
Figure 2:
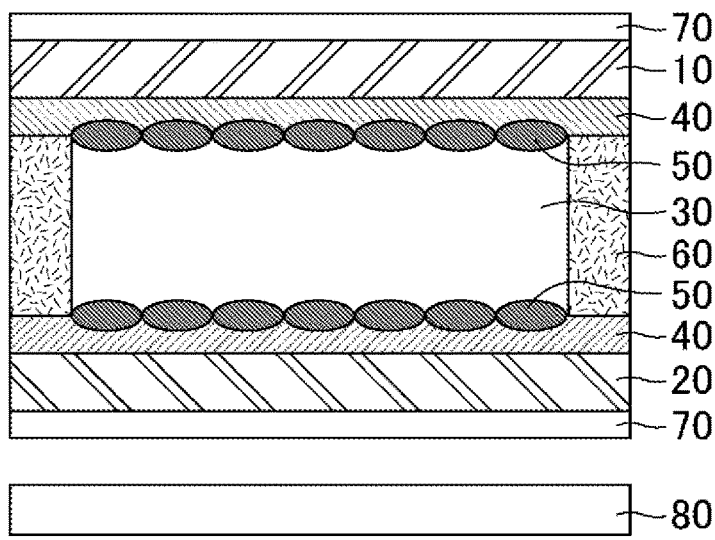
FIG. 2 is a schematic cross-sectional view of a liquid crystal display device of Embodiment 1.

FIG. 2 is a schematic cross-sectional view of a liquid crystal display device of Embodiment 1. As illustrated in FIG. 2, the liquid crystal display device of the present embodiment includes paired substrates 10 and 20, a liquid crystal layer 30 disposed between the substrates 10 and 20, photo-alignment films 40 disposed between the liquid crystal layer 30 and the respective substrates 10 and 20, and polymer layers 50 disposed between the liquid crystal layer 30 and the respective photo-alignment films 40. The photo-alignment films 40 each contain a polymer that contains photo-reactive functional groups. The polymer layers 50 each contain a polymer (hereinafter, also referred to as a PSA polymer) having a structure derived from a polymerization initiator represented by the following formula (1) (hereinafter, also referred to as a polymerization initiator (1)) and a structure derived from a monomer represented by the following formula (2) (hereinafter, also referred to as a bifunctional monomer (2)). The liquid crystal display device of the present embodiment further includes a backlight 80 behind the substrates 10 and 20, and the substrates 10 and 20 are attached to each other via a seal 60.

The photo-alignment film 40 may be disposed only on one of the substrates 10 and 20. In this case, for example, the substrate without a photo-alignment film 40 may be provided with an alignment film that is not a photo-alignment film (for example, a rubbed alignment film or an alignment film without any alignment treatment) and the polymer layer 50, or may be provided with the polymer layer 50 and without an alignment film.

[Chem. 6]

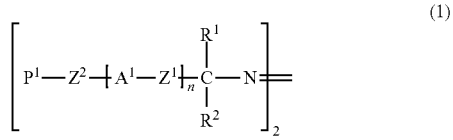

(1)

In the formula, P$^1$ is an acryloyloxy, methacryloyloxy, acryloylamino, methacryloylamino, vinyl, or vinyloxy group;

Z$^1$ and Z$^2$ are the same as or different from each other, and are each a —O—, —S—, —NH—, —CO—, —COO—, —OCO—, —NHCO—, —CONH—, —CH$_2$—, —CH(CH$_3$)—, —C(CH$_3$)$_2$—, —CF$_2$—, —C(OH)CO(CO)—, or —C(OH)C(HN)— group, or a direct bond;

R$^1$ and R$^2$ are the same as or different from each other, and are each a —H, —CH$_3$, —C$_2$H$_5$, —C$_3$H$_7$, —X (X is a halogen), —CN, —NH$_2$, —NH(CH$_3$), —N(CH$_3$)$_2$, —OH, —OCH$_3$, —OC$_2$H$_5$, or —OC$_3$H$_7$ group;

A$^1$ is a 1,4-phenylene, naphthalene-2,6-diyl, 1,4-cyclohexylene, or C1-C18 saturated or unsaturated alkylene group;

a —CH$_2$— group in A$^1$ may be replaced by a —O— group or a —S— group unless neighboring another one;

at least one hydrogen atom in A$^1$ may be replaced by a fluorine atom, a chlorine atom, a —CN group, or a C1-C6 alkyl, alkoxy, alkylcarbonyl, alkoxycarbonyl, or alkylcarbonyloxy group;

n is 0, 1, or 2; and when n is 2, the two A$^1$s on the same side of the azo group may be the same as or different from each other, and the two Z$^1$s on the same side of the azo group may be the same as or different from each other.

[Chem. 7]

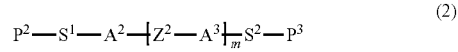

(2)

In the formula, P$^2$ and P$^3$ are the same as or different from each other, and are each an acryloyloxy, methacryloyloxy, acryloylamino, methacryloylamino, vinyl, or vinyloxy group;

A$^2$ and A$^3$ are the same as or different from each other, and are each a 1,4-phenylene, 4,4'-biphenyl, naphthalene-2,6-diyl, anthracene 2,6-diyl, or phenanthrene-2,7-diyl group;

Z$^2$ is a —COO—, —OCO—, —O—, —CO—, —NHCO—, —CONH—, or —S— group, or represents a direct bond between A$^2$ and A$^3$ or between A$^3$ and A$^3$;

m is 0, 1, or 2;

S$^1$ and S$^2$ are the same as or different from each other, and are each (CH$_2$)$_j$ (1≤j≤18) or (CH$_2$—CH$_2$—O)$_k$ (1≤k≤6), or represents a direct bond between P$^2$ and A$^2$ between A$^2$ and P$^3$, or between A$^3$ and P$^3$; and at least one hydrogen atom in A$^2$ and A$^3$ may be replaced by a halogen, methyl, or ethyl group.

The liquid crystal display device of the present embodiment includes the polymer layers 50 disposed between the liquid crystal layer 30 and the respective photo-alignment films 40, which can reduce the region (area) where photo-reactive functional groups in the photo-alignment films 40 and liquid crystal molecules in the liquid crystal layer 30 are in direct contact with each other. Therefore, even when ultraviolet light or visible light from the backlight 80 generates radicals from photo-reactive functional groups in the photo-alignment films 40, transfer of radicals to liquid crystal molecules can be reduced. This also applies to the cases in a high-temperature environment.

Since the polymerization initiator (1) generates radicals by heat, dissolving the polymerization initiator (1) and the bifunctional monomer (2) in the liquid crystal layer 30 and heating the liquid crystal layer 30 initiate radical polymerization of the bifunctional monomer (2) in the liquid crystal layer 30. Then, the polymer of the bifunctional monomer (2), i.e. the PSA polymer, is phase-separated from the liquid crystal layer 30 to form the polymer layers 50 between the liquid crystal layer 30 and the respective photo-alignment films 40. This means that the polymer layers 50 can be formed by thermally polymerizing the bifunctional monomer (2), and thus the liquid crystal layer 30 is not required to be irradiated with light in forming the polymer layers 50. Therefore, generation of radicals from the photo-alignment films 40 can be reduced in forming the polymer layers 50. In contrast, if a monomer is photo-polymerized to form a polymer layer, radicals are generated from photo-reactive functional groups (in particular, photo-reactive functional groups that absorb light with a wavelength of 360 nm or longer) of the photo-alignment films during the formation thereof, and the radicals are transferred to liquid crystal molecules, causing a reduction in VHR.

If a typical thermal polymerization initiator is used and part of it remains unreacted after the completion of thermal polymerization, radicals are generated from the unreacted part of the thermal polymerization initiator and some of the radicals are ionized during the use of a liquid crystal display device, reducing the VHR. In contrast, the polymerization initiator (1) is a polymerizable group-containing polymerization initiator in which a polymerizable group ($P^1$) is attached to the respective sides of the azo group. Thus, the initiator can be introduced into the PSA polymer even when it fails to contribute to the start of the polymerization during the thermal polymerization, reducing the amount of unreacted part of the polymerization initiator (1) remaining in the liquid crystal layer 30. Therefore, radicals due to an unreacted part of the polymerization initiator (1) can be reduced.

Figure 3:
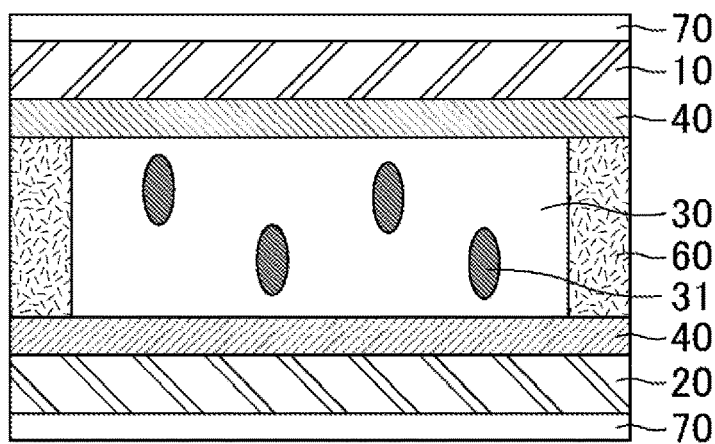
FIG. 3 is a schematic cross-sectional view of a liquid crystal display device according to Comparative Embodiment 2.

FIG. 3 is a schematic cross-sectional view of a liquid crystal display device according to Comparative Embodiment 2. As illustrated in FIG. 3, the liquid crystal display device of Comparative Embodiment 2 is substantially similar to the liquid crystal display device of Embodiment 1, except that the liquid crystal layer 30 contains a radical scavenger 31 instead of the presence of the polymer layers 50. In the case of only adding (dissolving) a radical scavenger 31 to (in) the liquid crystal layer 30 as in the present comparative embodiment, the radical scavenger 31 remains in the liquid crystal layer. The radical scavenger 31 can freely diffuse, and thus may thermally react with specific components of the photo-alignment films 40 and the seal 60, may generate impurities, and may slightly change the physical properties of the liquid crystal material. In contrast, the present embodiment reduces remaining of additives such as the bifunctional monomer (2) and the polymerization initiator (1) in the liquid crystal layer 30, and thus can reduce occurrence of new thermal reactions of the additives and can reduce changes in the physical properties of the liquid crystal material.

Patent Literature 1 discloses in the paragraph [0057] that a polymerization initiator may be used in order to promote polymerization of a polymerizable compound added to a liquid crystal composition. However, it does not disclose the polymerization initiator (1). The polymerization initiators disclosed in the paragraph [0057] of Patent Literature 1 each generate radicals by both light and heat. Thus, when remaining in the liquid crystal layer, such polymerization initiators seem to cause a reduction in reliability due to generation of radicals. In contrast, the polymerization initiator (1) of the present embodiment is likely to generate radicals due to heat but hardly generates radicals due to light, although it requires temperature control of the liquid crystal material.

Further, many polymerization initiators including any of the polymerization initiators disclosed in Patent Literature 1 contain no polymerizable group in the molecule, and unreacted part of the polymerization initiator remains in the liquid crystal layer. Also, in this respect, these polymerization initiators are different from the polymerization initiator (1) of the present embodiment. As mentioned above, the polymerization initiator (1) contains two polymerizable groups (on the respective sides of the azo group) in one molecule. Thus, the polymerization initiator (1) can contribute to the polymerization even when it fails to contribute to the start of the polymerization. Therefore, remaining of unreacted part of the polymerization initiator (1) in the liquid crystal layer 30 can be reduced even when the initiator fails to contribute to the start of the polymerization.

As described above, the liquid crystal display device of the present embodiment includes the photo-alignment films 40 containing a polymer that contains photo-reactive functional groups, and further includes the polymer layers 50 containing a polymer (PSA polymer) that has a structure derived from the polymerization initiator (1) and a structure derived from the bifunctional monomer (2) between the liquid crystal layer 30 and the respective photo-alignment films 40. This can reduce transfer of radicals to liquid crystal molecules and generation itself of radicals. As a result, the liquid crystal display device is capable of maintaining a favorable voltage holding ratio and reducing occurrence of image sticking and stain and a decrease in contrast ratio in a high-temperature environment for a long time.

The substrates 10 and 20 may be a pair of an active matrix substrate (TFT substrate) and a color filter (CF) substrate, for example. The active matrix substrate may be one typically used in the field of liquid crystal display devices. The active matrix substrate may have a plan structure in which on a transparent substrate are disposed multiple parallel gate signal lines; multiple parallel source signal lines extending in the direction perpendicular to the gate signal lines; active elements such as thin film transistors (TFTs) disposed at the respective intersections of the gate signal lines and the source signal lines; and pixel electrodes disposed in the respective regions defined by the gate signal lines and the source signal lines in a matrix pattern. In the case of a horizontal alignment mode, components such as a common conductive line and a common electrode coupled with the common conductive line are further disposed.

The TFTs are preferably those provided with channels formed of amorphous silicon, polysilicon, or indium-gallium-zinc-oxygen (IGZO) which is an oxide semiconductor. An oxide semiconductor has a low off-leakage current and thus is particularly advantageous to low-frequency driving of a liquid crystal display device. Still, if the VHR is low, low-frequency driving is not achieved. The present embodiment can increase the VHR, and thus enables low-frequency driving. In other words, a combination of an oxide semiconductor and the present embodiment is particularly preferred.

In a typical active matrix-type display mode, a signal voltage is applied to an electrode through a TFT when the TFT disposed on a pixel is turned on. The electric charge given to the pixel at this time is held in the period during which the TFT is turned off. The voltage holding ratio (VHR) represents the ratio of the electric charge held during one frame period (e.g., 16.7 ms) to the given electric charge. In other words, a low VHR means that the voltage applied to the liquid crystal layer is easily attenuated over time. Active matrix-type display modes thus require a high VHR.

The color filter substrate may be one typically used in the field of liquid crystal display devices. The color filter substrate may have a structure in which on a transparent substrate are disposed components such as a black matrix in a grid pattern and color filters disposed inside the respective grid lines, i.e., pixels.

For the substrates 10 and 20, a set of the color filters and the active matrix both may be disposed on one of the substrates.

The photo-alignment films 40 each have a function to control the alignment of liquid crystal molecules in the liquid crystal layer 30. When voltage applied to the liquid crystal layer 30 is lower than the threshold voltage (including the case with no voltage applied), the alignment of liquid crystal molecules in the liquid crystal layer 30 is controlled mainly by the function of the photo-alignment films 40. In this state (hereinafter, also referred to as an initial alignment state), the angle formed by the major axes of the liquid crystal molecules with the surfaces of the substrates 10 and 20 is called a "pre-tilt angle". The "pre-tilt angle" as used herein means the angle of the gradient of the liquid crystal molecules from the direction parallel to the substrate surfaces, with the angle parallel to the substrate surfaces being 0° and the angle of the line normal to the substrate surfaces being 90°.

The photo-alignment films 40 may give any pre-tilt angle to the liquid crystal molecules. The photo-alignment films 40 may substantially horizontally align liquid crystal molecules in the liquid crystal layer 30 (horizontal alignment films), or may substantially vertically align liquid crystal molecules in the liquid crystal layer 30 (vertical alignment films). In the case of a horizontal alignment film, the term "substantially horizontally" means that the pre-tilt angle is preferably substantially 0° (e.g., smaller than 10°). In order to achieve an effect of maintaining good contrast performance for a long time, the pre-tilt angle is more preferably 0°. In the case where the display mode is the IPS mode or the FFS mode, the pre-tilt angle is preferably 0° also in terms of the viewing angle performance. In the case where the display mode is the TN mode, the pre-tilt angle is set to about 2°, for example, due to restrictions relating to the mode. In the case of a vertical alignment film, the term "substantially vertically" means that the pre-tilt angle is preferably 83.0° or greater. In terms of the viewing angle performance, response performance, dark-line thicknesses (having an influence on the transmittance) in four-domain division alignment, and alignment stability, the pre-tilt angle is more preferably 88.0° or greater. A pre-tilt angle of 83.0° or greater is suitable for display modes utilizing the voltage-applied PSA (PSA using photo-alignment film) (in this mode, the pre-tilt angle may also be set to 85° or smaller in some cases).

The photo-alignment films 40 each contain a polymer that contains photo-reactive functional groups (hereinafter, also referred to as a photo-reactive group-containing polymer). The photo-reactive functional group means a functional group whose structure may be changed by application of light (electromagnetic waves) such as ultraviolet light and visible light. This structural change of the photo-reactive functional group allows the photo-alignment film 40 to exhibit the alignment-controlling force and changes the level and/or direction of the alignment-controlling force of the photo-alignment film 40. The alignment-controlling force means an ability to control the alignment of liquid crystal molecules in the vicinity of the alignment film.

The presence of photo-reactive functional groups in the photo-alignment film 40 enables alignment treatment (photo-alignment treatment) on the photo-alignment film 40 by light irradiation. The photo-alignment treatment is a dustless, highly reliable method of aligning liquid crystal with excellent in-plane uniformity. This method enables direct alignment treatment on the photo-alignment film 40 and thus can eliminate alignment-controlling means (e.g., protrusions or structures) which serve as transmittance-reducing factors, resulting in a high transmittance.

Examples of the structural change of the photo-reactive functional group include dimerization (dimer formation), isomerization, photo-Fries rearrangement, or decomposition. Specific examples of the photo-reactive functional groups include cinnamate, chalcone, azobenzene, cumarin, tolane, and stilbene groups. The photo-reactive functional groups (in particular, photo-reactive functional groups that absorb light with a wavelength of 360 nm or longer) may unfortunately be decomposed by light applied during photo-alignment treatment or light from the backlight 80 during the use of the liquid crystal display device to generate radicals. Still, even when radicals are generated from the photo-alignment film 40 by light irradiation, the polymer layer 50 disposed between the liquid crystal layer 30 and the photo-alignment film 40 can reduce dissolution of the radicals in the liquid crystal layer 30. The photo-reactive functional groups that absorb light with a wavelength of 360 nm or longer each may be an azobenzene, chalcone, or cinnamate group. Thus, when the photo-reactive functional groups are any of these functional groups, the liquid crystal display device of the present embodiment can significantly exert an effect of reducing dissolution of radicals in the liquid crystal layer 30.

The photo-reactive group-containing polymer contained in the photo-alignment film 40 may have any structure other than the photo-reactive functional groups, and the photo-reactive group-containing polymer is preferably a polyamic acid, a polyimide, a polysiloxane, a polyvinyl, or a polymaleimide.

The photo-reactive group-containing polymer may be a homopolymer, but is preferably a copolymer. In the case of a copolymer, it may have any monomer unit arrangement. The photo-reactive group-containing polymer may be an alternate copolymer, a random copolymer, a block copolymer, or a grafted copolymer.

When the photo-reactive group-containing polymer is a polyamic acid, the photo-reactive group-containing polymer may contain a repeating unit represented by the following formula (3):

[Chem. 8]

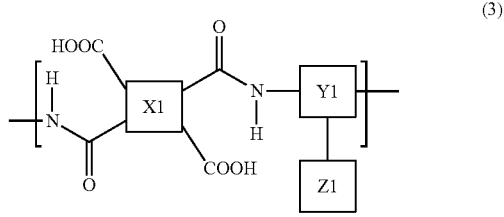

(3)

wherein X1 is a structure represented by any of the following formulas (X1-1) to (X1-12) and (X1-P1) to (X1-P4), and at least one hydrogen atom contained in each structure may be replaced by a halogen, a methyl group, or an ethyl group; Y1 is a structure represented by any of the following formulas (Y1-1) to (Y1-16) and (Y1-P1) to (Y1-P8), and at least one hydrogen atom contained in each structure may be replaced by a halogen, a methyl group, or an ethyl group; Z1 is a side chain; at least one of X1, Y1, and Z1 contains a photo-reactive functional group; in one molecule of the photo-reactive group-containing polymer, at least one or all of the structures represented by the formula (3) may not contain Z1.

[Chem. 9]

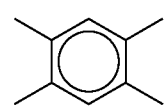

(X1-1)

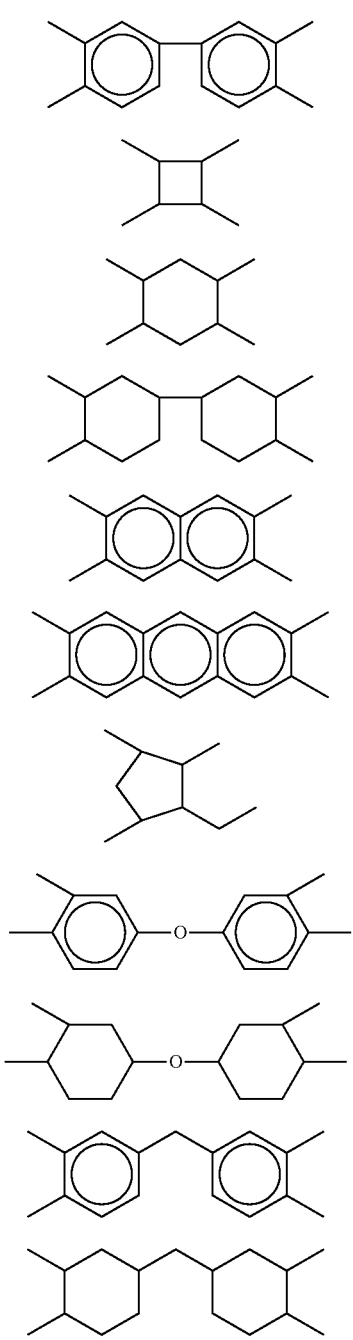
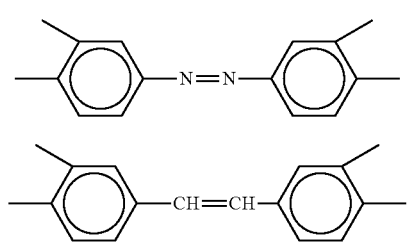
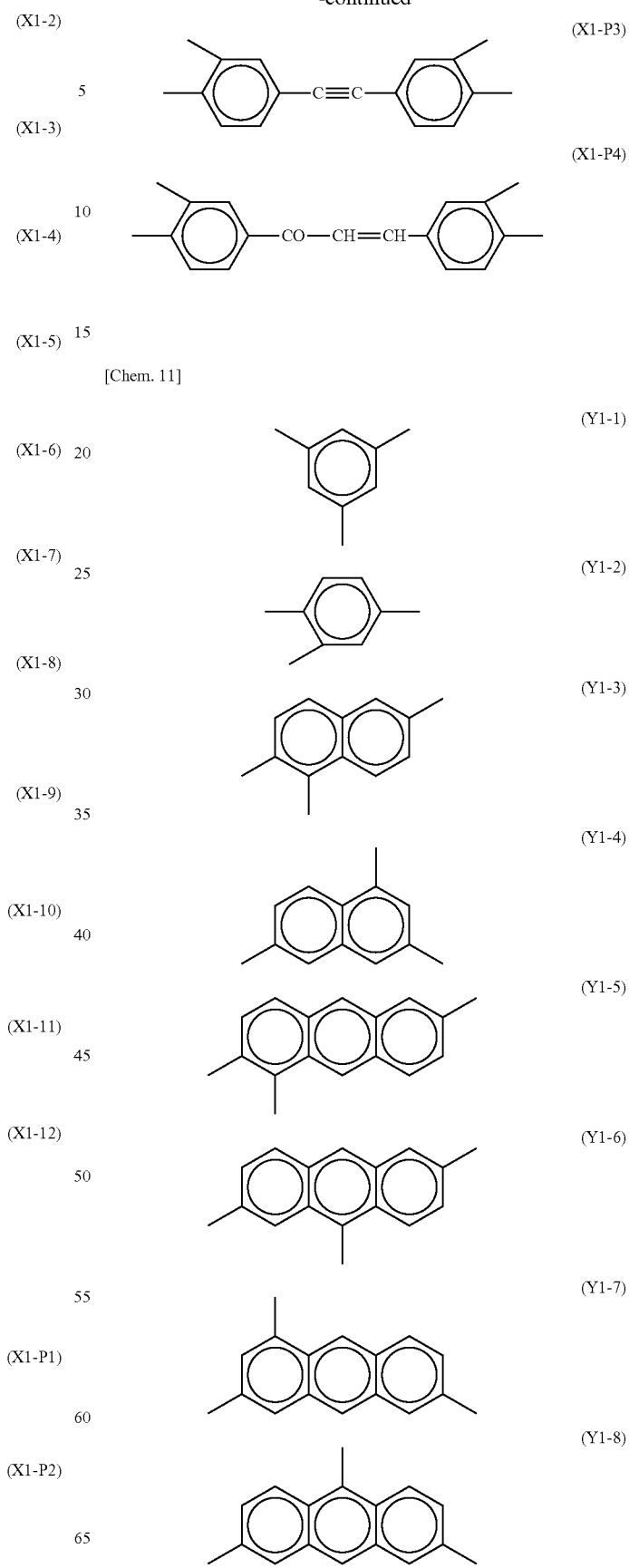

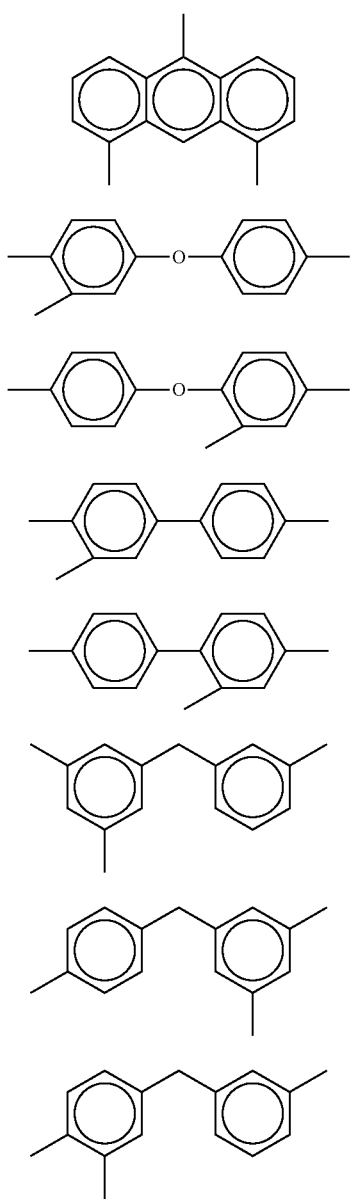
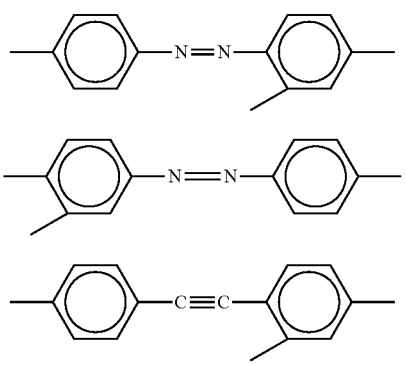
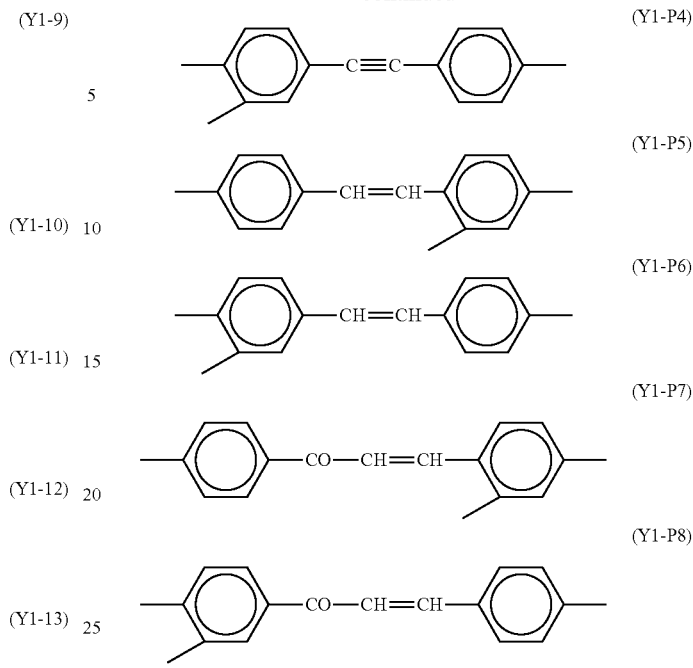

When X1 contains a photo-reactive functional group, X1 is any of the structures represented by the formulas (X1-P1) to (X1-P4).

When Y1 contains a photo-reactive functional group, Y1 is any of the structures represented by the formulas (Y1-P1) to (Y1-P8).

When Z1 contains a photo-reactive functional group, Z1 is preferably a structure represented by the following formula (Z1-HP1) or (Z1-HP2). The presence of any of these structures allows the photo-alignment film 40 to function as a horizontal alignment film. In the following formula (Z1-HP2), the methyl group may bond to any carbon atom in the benzene ring.

[Chem. 13]

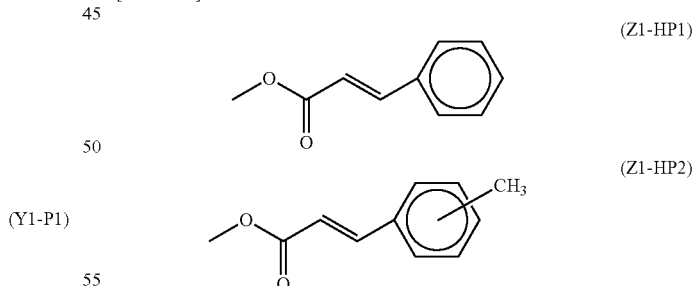

When the photo-alignment film 40 is a horizontal alignment film, in one molecule of the photo-reactive group-containing polymer, one or more (but not all) of the structures represented by the formula (3) may additionally contain as Z1 a functional group that can substantially horizontally align liquid crystal molecules without light irradiation (hereinafter, also referred to as a horizontal alignment functional group).

Specific examples of the horizontal alignment functional group include the structures represented by the following formulas (Z1-H1), (Z1-H2), (Z1-H3), (Z1-H4), (Z1-H5), (Z1-H6), (Z1-H7), and (Z1-H8).
[Chem. 14]
—H (Z1-H1)
—CH₃ (Z1-H2)
—C₂H₅ (Z1-H3)
—CF₃ (Z1-H4)
 (Z1-H5)
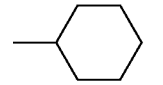 (Z1-H6)
 (Z1-H7)
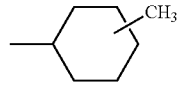 (Z1-H8)
When Z1 contains a photo-reactive functional group, Z1 is also preferably a structure represented by any of the following formulas (Z1-VP1) to (Z1-VP21). The presence of any of these structures allows the photo-alignment film 40 to function as a vertical alignment film.
[Chem. 15]
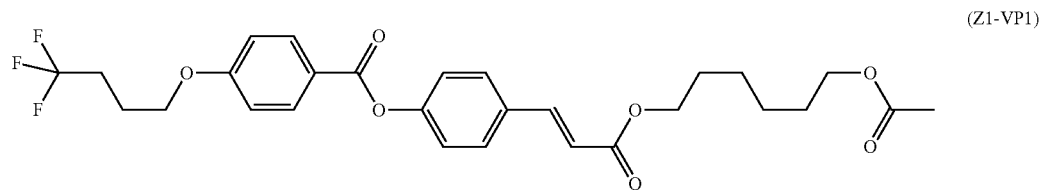 (Z1-VP1)
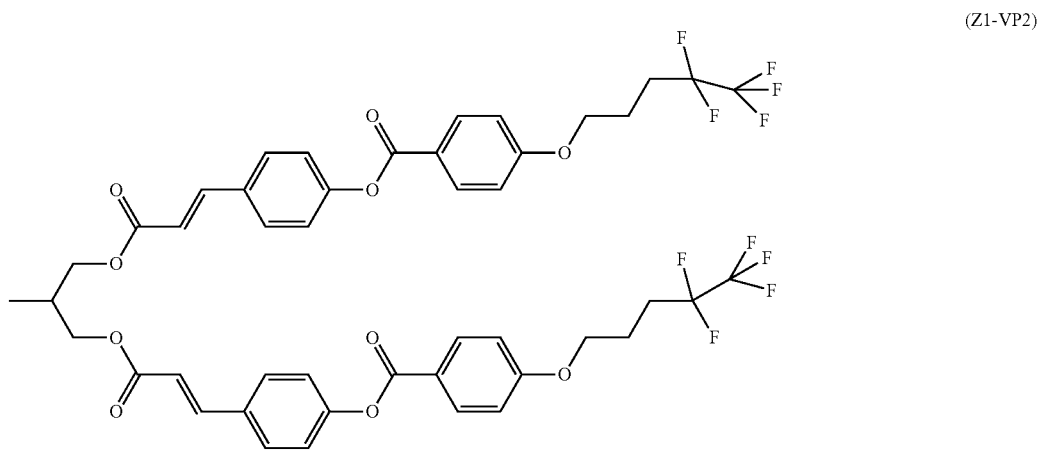 (Z1-VP2)
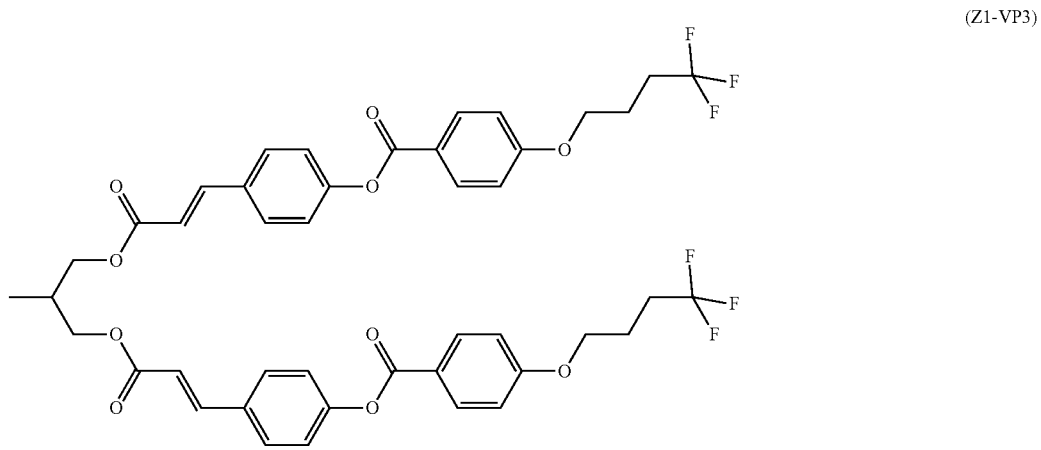 (Z1-VP3)

-continued
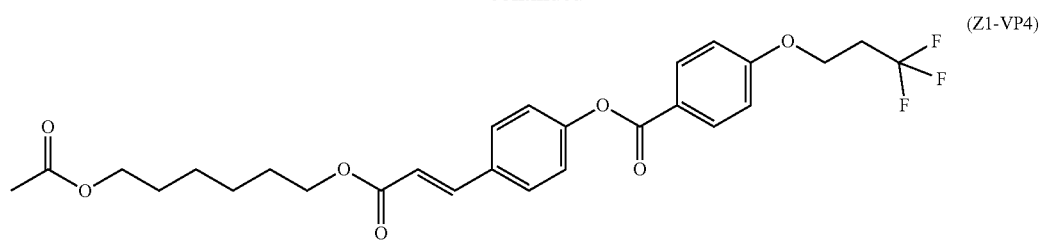
(Z1-VP4)
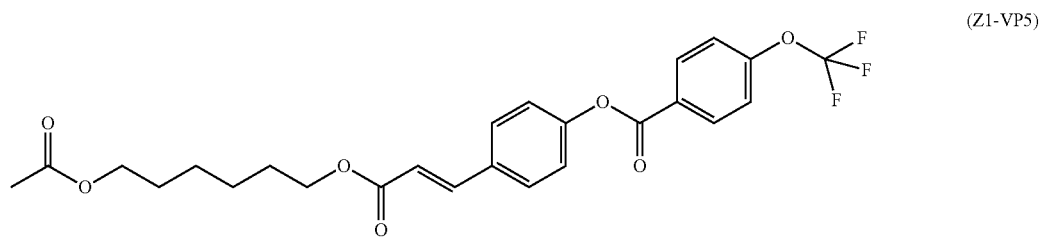
(Z1-VP5)
[Chem. 16]
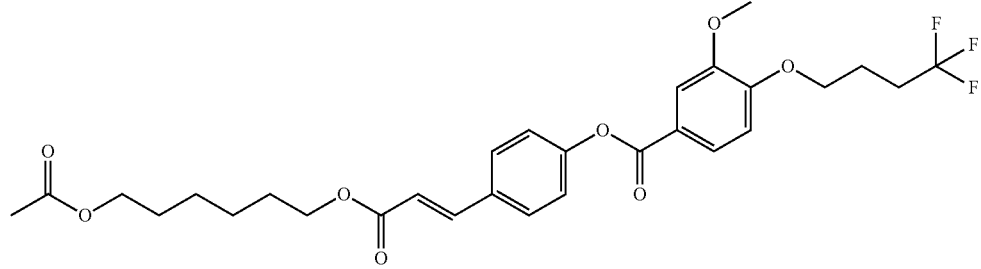
(Z1-VP6)
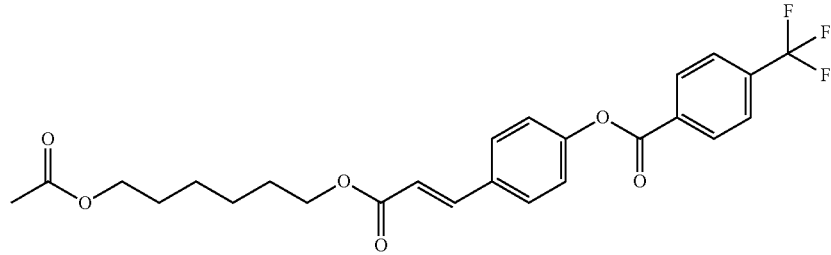
(Z1-VP7)
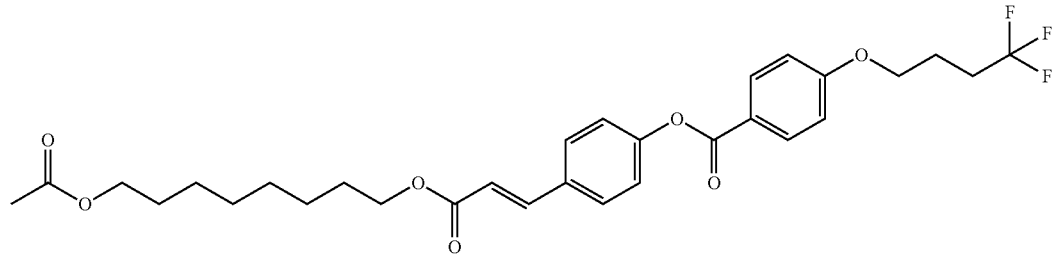
(Z1-VP8)
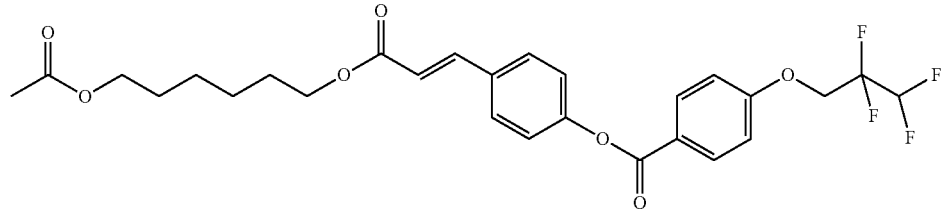
(Z1-VP9)

-continued
(Z1-VP10)
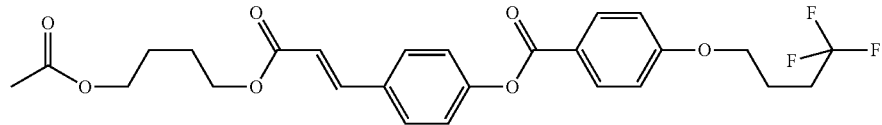
(Z1-VP11)
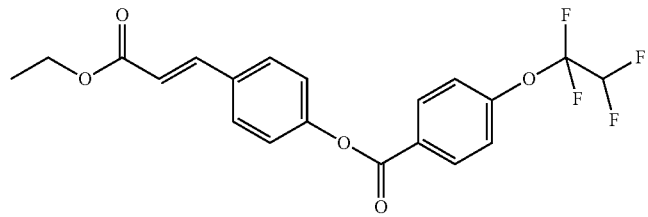
[Chem. 17]
(Z1-VP12)
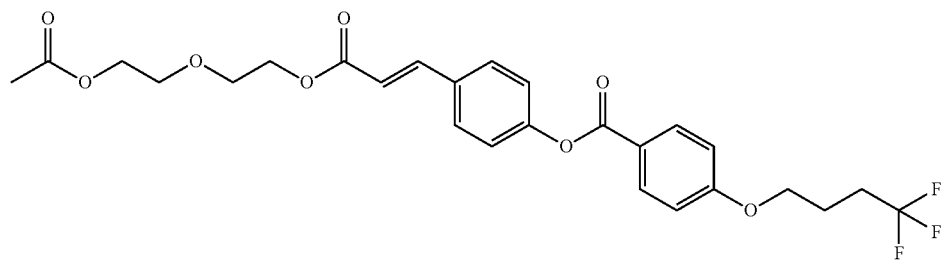
(Z1-VP13)
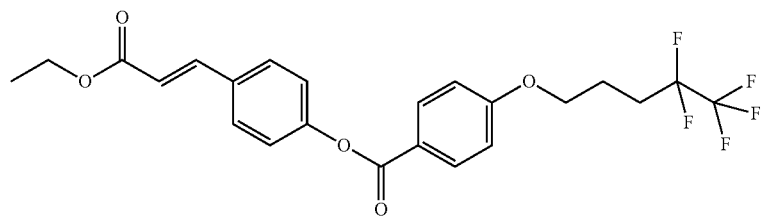
(Z1-VP14)
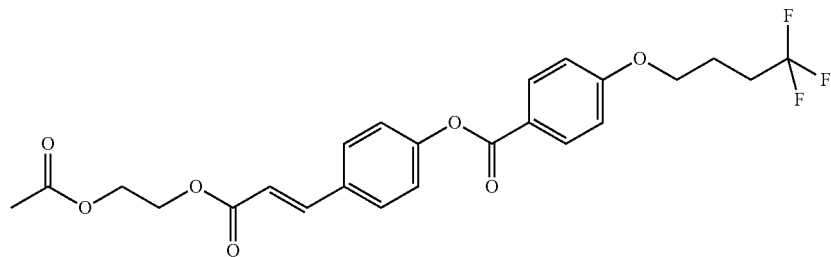
(Z1-VP15)
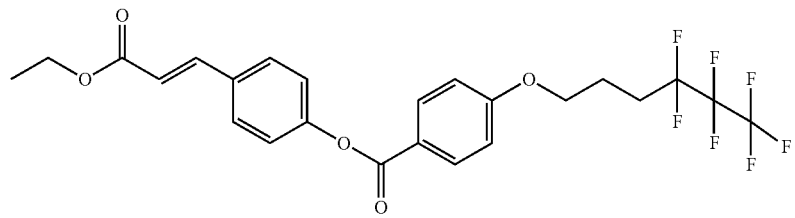

(Z1-VP16)
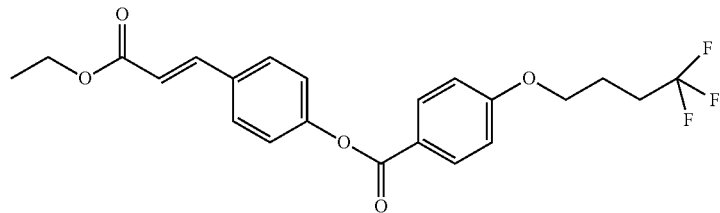
(Z1-VP17)
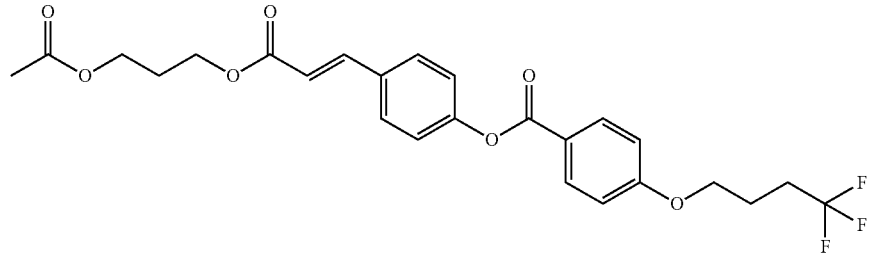
[Chem. 18]
(Z1-VP18)
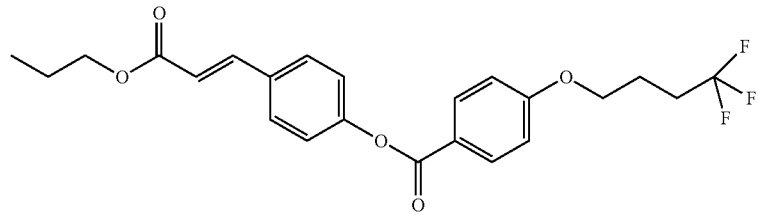
(Z1-VP19)
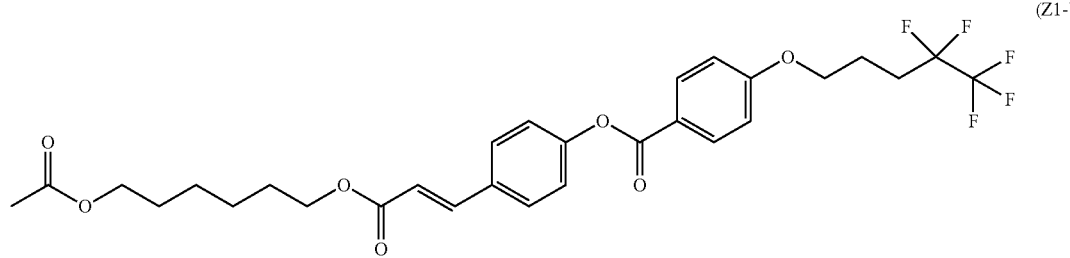
(Z1-VP20)
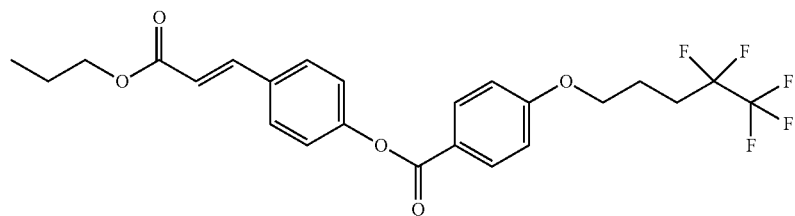
(Z1-VP21)
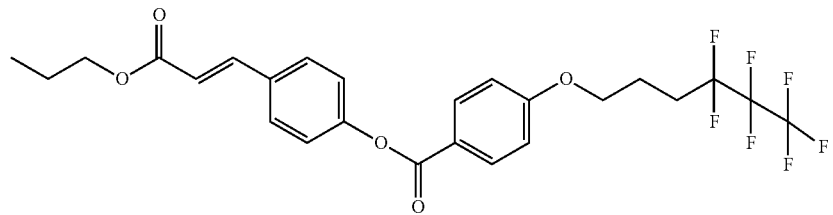

When the photo-alignment film 40 is a vertical alignment film, in one molecule of the photo-reactive group-containing polymer, one or more (but not all) of the structures represented by the formula (3) may additionally contain as Z1 a functional group that can substantially vertically align liquid crystal molecules without light irradiation (hereinafter, also referred to as a vertical alignment functional group).

Specific examples of the vertical alignment functional group include the structures represented by the following formulas (Z1-V1), (Z1-V2), (Z1-V3), (Z1-V4), (Z1-V5), (Z1-V6), or (Z1-V7).

[Chem. 19]

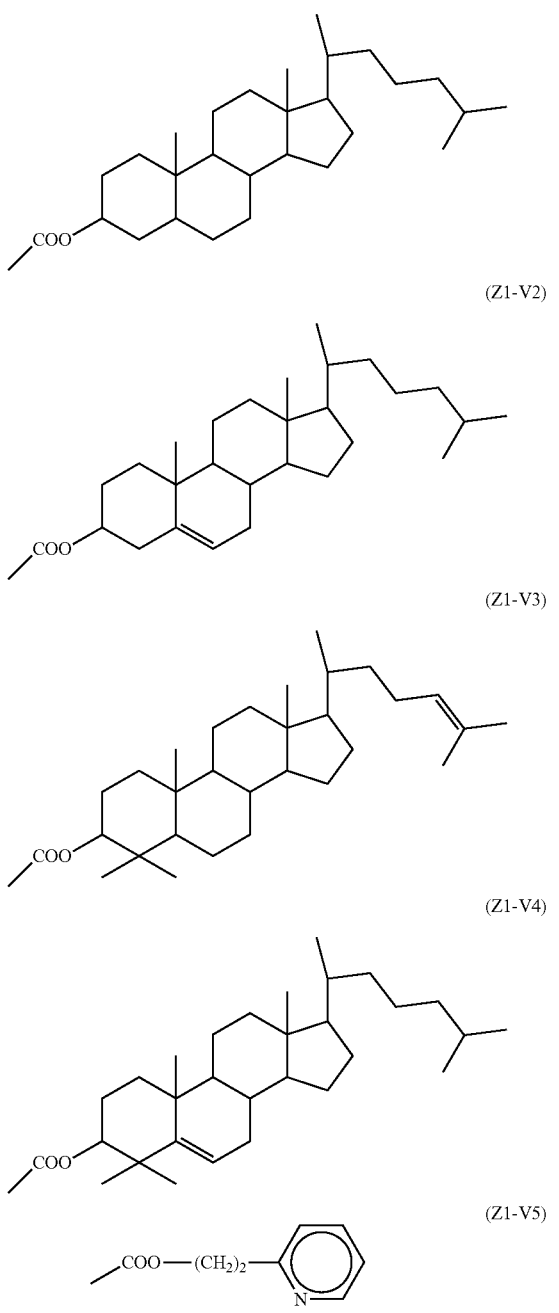

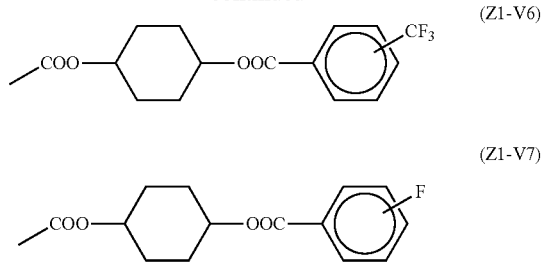

One molecule of the photo-reactive group-containing polymer may contain one or two or more different X1s, one or two or more different Y1s, and one or two or more different Z1s (if contained). For example, one molecule of the photo-reactive group-containing polymer may contain both the structure represented by the formula (X1-1) and the structure represented by the formula (X1-2).

The photo-alignment film 40 may contain only one photo-reactive group-containing polymer containing a repeating unit represented by the formula (3), or may contain two or more different photo-reactive group-containing polymers each containing a repeating unit represented by the formula (3).

When the photo-reactive group-containing polymer is a polyamic acid, the weight average molecular weight thereof is preferably 2,500 or more and 1,000,000 or less. If the weight average molecular weight is more than 1,000,000, a liquid crystal alignment agent may have a viscosity that is too high to provide a photo-alignment film 40. The weight average molecular weight can be determined by gel permeation chromatography (GPC).

In one molecule of the photo-reactive group-containing polymer, when only some of the multiple structures represented by the formula (3) contain a side chain and the others do not contain a side chain, these multiple structures may be arranged in any manner. For example, the structural units containing a side chain (represented by "A") and the structural units containing no side chain (represented by "B") may be arranged in an alternate manner (e.g., "ABABAB"), in a random manner (e.g., "AABABB"), or in a block manner (e.g., "AAABBB") in the photo-reactive group-containing polymer.

When the photo-reactive group-containing polymer is polyimide, the photo-reactive group-containing polymer may be one produced by dehydrating and cyclizing (imidizing) a polyamic acid containing a repeating unit represented by the formula (3) with heat or a catalyst. In one molecule of the photo-reactive group-containing polymer, only some of the structures represented by the formula (3) may be imidized, or all of the structures may be imidized.

When the photo-reactive group-containing polymer is polyimide, the weight average molecular weight thereof is preferably 2,500 or more and 1,000,000 or less. If the weight average molecular weight is more than 1,000,000, a liquid crystal alignment agent may have a viscosity that is too high to provide a photo-alignment film 40.

When the photo-reactive group-containing polymer is polysiloxane, the photo-reactive group-containing polymer may contain a repeating unit represented by the following formula (4):

[Chem. 20]

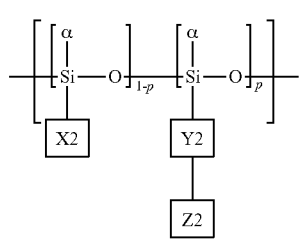

(4)

wherein α is a —H, —OH, methoxy, or ethoxy group; X2 is a side chain containing a photo-reactive functional group; Y2 is a C1-C6 saturated or unsaturated alkylene or alkyleneoxy group; $Z^2$ is an epoxy group; and p is a real number of 0<p≤0.5.

In one molecule of the photo-reactive group-containing polymer, one or more (but not all) of the structures represented by the formula (4) may additionally contain as X2 a horizontal alignment functional group or a vertical alignment functional group.

Specific examples of the horizontal alignment functional group include the structures represented by the formulas (Z1-H1), (Z1-H2), (Z1-H3), (Z1-H4), (Z1-H5), (Z1-H6), (Z1-H7), and (Z1-H8). Specific examples of the vertical alignment functional group include the structures represented by the formulas (Z1-V1), (Z1-V2), (Z1-V3), (Z1-V4), (Z1-V5), (Z1-V6), and (Z1-V7).

More specific examples of the photo-reactive group-containing polymer containing a repeating unit represented by the formula (4) include those containing a repeating unit represented by the following formula (4-1) or (4-2):

[Chem. 21]

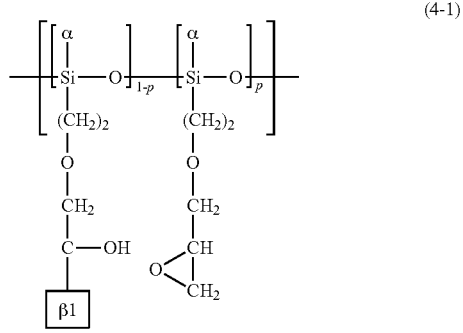

(4-1)

wherein α is a —H, —OH, methoxy, or ethoxy group; β1 is a structure represented by the following formula (β1-1) or (β1-2); and p is a real number of 0<p≤0.5,

[Chem. 22]

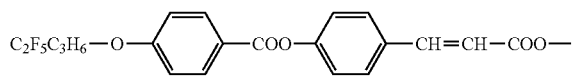

(β1-1)

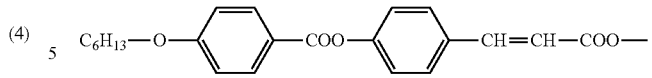

(β1-2)

[Chem. 23]

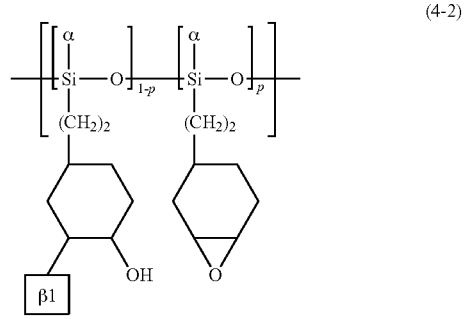

(4-2)

wherein α is a —H, —OH, methoxy, or ethoxy group; β1 is a structure represented by the formula (β1-1) or (β1-2); and p is a real number of 0<p≤0.5.

One molecule of the photo-reactive group-containing polymer may contain one or two or more different as, one or two or more different X2s, and one or two or more different Y2s. For example, one molecule of the photo-reactive group-containing polymer may contain both the structure represented by the formula (β1-1) and the structure represented by the formula (β1-2).

The photo-alignment film 40 may contain only one photo-reactive group-containing polymer containing a repeating unit represented by the formula (4), or may contain two or more different photo-reactive group-containing polymers each containing a repeating unit represented by the formula (4).

When the photo-reactive group-containing polymer is polysiloxane, the weight average molecular weight thereof is preferably 2,500 or more and 1,000,000 or less. If the weight average molecular weight is more than 1,000,000, a liquid crystal alignment agent may have a viscosity that is too high to provide a photo-alignment film 40.

In the repeating unit, units containing X2 and units containing Y2 may be arranged in any manner. For example, the units containing X2 (represented by "C") and the units containing Y2 (represented by "D") may be arranged in an alternate manner (e.g., "CDCDCD"), in a random manner (e.g., "CCDCDD"), or in a block manner (e.g., "CCCDDD") in the photo-reactive group-containing polymer.

When the photo-reactive group-containing polymer is polyvinyl, the photo-reactive group-containing polymer may contain a repeating unit represented by the following formula (5):

[Chem. 24]

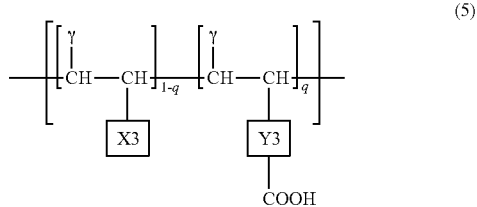

(5)

wherein γ is a —H, —CH$_3$, or —C$_2$H$_5$ group; X3 is a side chain containing a photo-reactive functional group; Y3 is a C1-C6 saturated or unsaturated alkylene or alkyleneoxy group, an ethylene glycol group with a repeating number of 1 to 6, or a direct bond; and q is a real number of 0<q≤0.5.

In one molecule of the photo-reactive group-containing polymer, one or more (but not all) of the structures represented by the formula (5) may additionally contain as X3 a horizontal alignment functional group or a vertical alignment functional group.

Specific examples of the horizontal alignment functional group include the structures represented by the formula (Z1-H1), (Z1-H2), (Z1-H3), (Z1-H4), (Z1-H5), (Z1-H6), (Z1-H7), and (Z1-H8). Specific examples of the vertical alignment functional group include the structures represented by the formula (Z1-V1), (Z1-V2), (Z1-V3), (Z1-V4), (Z1-V5), (Z1-V6), and (Z1-V7).

More specific examples of the photo-reactive group-containing polymer containing a repeating unit represented by the formula (5) include those containing a repeating unit represented by the following formula (5-1):

[Chem. 25]

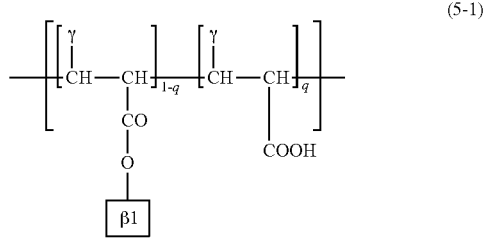

(5-1)

wherein γ is a —H, —CH$_3$, or —C$_2$H$_5$ group; β1 is a structure represented by the formula (β1-1) or (β1-2); and q is a real number of 0<q≤0.5.

One molecule of the photo-reactive group-containing polymer may contain one or two or more different γs, one or two or more different X3s, and one or two or more different Y3s. For example, one molecule of the photo-reactive group-containing polymer may contain both the structure represented by the formula (β1-1) and the structure represented by the formula (β1-2).

The photo-alignment film 40 may contain only one photo-reactive group-containing polymer containing a repeating unit represented by the formula (5), or may contain two or more different photo-reactive group-containing polymers each containing a repeating unit represented by the formula (5).

When the photo-reactive group-containing polymer is polyvinyl, the weight average molecular weight thereof is preferably 2,500 or more and 1,000,000 or less. If the weight average molecular weight is more than 1,000,000, a liquid crystal alignment agent may have a viscosity that is too high to provide a photo-alignment film 40.

In the repeating unit, units containing X3 and units containing Y3 may be arranged in any manner. For example, the units containing X3 (represented by "E") and the units containing Y3 (represented by "F") may be arranged in an alternate manner (e.g., "EFEFEF"), in a random manner (e.g., "EEFEFF"), or in a block manner (e.g., "EEEFFF") in the photo-reactive group-containing polymer.

The photo-alignment film 40 may contain other additional components in addition to the photo-reactive group-containing polymer. Examples of the additional components include polymers other than the above photo-reactive group-containing polymers, curing agents, curing accelerators, and catalysts. Polymers other than the photo-reactive group-containing polymers may be used in order to further improve the solution characteristics of a liquid crystal alignment agent and the electric properties of an alignment film. Examples of such polymers include polymers for typical alignment films containing no photo-reactive functional group. When the photo-alignment film 40 contains a polymer for alignment films containing no photo-reactive functional group, the photo-alignment film 40 may have a bilayer structure. This bilayer structure may include a lower layer mainly formed of a polymer for alignment films containing no photo-reactive functional group and an upper layer mainly formed of a photo-reactive group-containing polymer. The upper layer may be in contact with the liquid crystal layer.

The thickness of the photo-alignment film 40 may be, but not limited to, preferably 1 nm or greater, more preferably 3 nm or greater, still more preferably 5 nm or greater, particularly preferably 8 nm or greater. The thickness of the photo-alignment film 40 is preferably 300 nm or smaller, more preferably 150 nm or smaller, still more preferably 120 nm or smaller, particularly preferably 100 nm or smaller. In general, transfer of radicals is less likely to occur as the distance thereof is greater. In the case of a photo-alignment film, the thinner the film is, the smaller the absolute total amount of the photo-reactive functional groups and the lower the probability of radical transfer is. Therefore, in order to effectively reduce the transfer of radicals to liquid crystal molecules, the thickness of the photo-alignment film 40 is preferably as small as possible.

In the present embodiment, the polymer layers 50 are disposed between the liquid crystal layer 30 and the respective photo-alignment films 40. The polymer layers 50 each contain a polymer (PSA polymer) that has a structure derived from the polymerization initiator (1) and a structure derived from the bifunctional monomer (2). The polymer layer 50 is formed by a polymer sustained alignment (PSA) technique. The PSA technique is a technique of forming a polymer on an alignment film surface by enclosing a liquid crystal composition containing a polymerizable monomer between paired substrates and then polymerizing the polymerizable monomer and fixing the initial alignment state of liquid crystal molecules by this polymer. Therefore, in addition to the above effects, the polymer layers 50 can fix the initial alignment state of liquid crystal molecules in the liquid crystal layer 30.

The PSA polymer is a polymer formed by polymerization of at least the bifunctional monomer (2). Here, the polymerization initiator (1) is decomposed by heating at the azo group to generate two radicals, initiating the radical polymerization reaction of the bifunctional monomer (2). Thus, the PSA polymer may contain a structure derived from the polymerization initiator (1) at least at an end. In other words, the PSA polymer may have a structure represented by the following formula (1-1) at least at an end.

[Chem. 26]

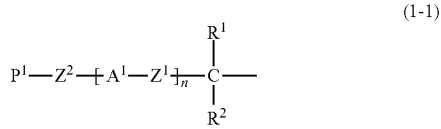

(1-1)

Further, the polymerization initiator (1) contains two polymerizable groups (=$P^1$) in one molecule. Thus, it can contribute to polymerization of the bifunctional monomer (2) even when it fails to contribute to the start of polymerization. Therefore, the PSA polymer may contain a structure derived from the polymerization initiator (1) in the main chain.

As described above, the PSA polymer may be a polymer obtainable by polymerizing at least the polymerization initiator (1) and the bifunctional monomer (2). The PSA polymer may contain one or two or more different polymerization initiators (1) and may contain one or two or more different bifunctional monomers (2).

Examples of preferred structures of the polymerization initiator (1) include the following.

In the formula (1), $P^1$ is preferably an acryloyloxy group or a methacryloyloxy group.

In the formula (1), preferably, $Z^1$ and $Z^2$ are the same as or different from each other, and are each a —O— group or a direct bond.

In the formula (1), $R^1$ is preferably a —$CH_3$ group.

In the formula (1), $R^2$ is preferably a —$CH_3$ group or a —CN group.

In the formula (1), $A^1$ is preferably a C1-C8 saturated or unsaturated alkylene group.

In the formula (1), n is preferably 1 or 2.

Preferred specific examples of the bifunctional monomer (2) include those represented by the following formulas (2-1) to (2-4):

[Chem. 27]

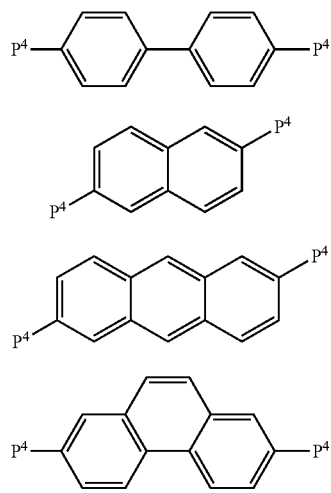

(2-1)

(2-2)

(2-3)

(2-4)

wherein $P^4$s are the same as or different from each other, and are each an acryloyloxy, methacryloyloxy, acryloylamino, or methacryloylamino group; at least one hydrogen atom in the cyclic structures may be replaced by a halogen atom, a methyl group, or an ethyl group.

The PSA polymer may have any weight average molecular weight, and the weight average molecular weight may be similar to that of a polymer formed by a common PSA technique.

In many cases, the polymer formed by radical polymerization contains remaining radicals at ends. Thus, if the PSA polymer in the polymer layer 50 slightly dissolves in the liquid crystal layer 30, the VHR may possibly be reduced. In contrast, when the PSA polymer is chemically bonded to the photo-reactive group-containing polymer contained in the photo-alignment film 40, the PSA polymer is less likely to dissolve in the liquid crystal layer 30. Thus, in order to reduce dissolution of the PSA polymer in the liquid crystal layer 30 and to further improve the long-term reliability of the liquid crystal display device of the present embodiment, the photo-reactive group-containing polymer contained in the photo-alignment film 40 is preferably bonded to the PSA polymer (especially its end) contained in the polymer layer 50.

When the photo-reactive functional groups of the photo-reactive group-containing polymer absorb light with a wavelength of 360 nm or longer, radicals are easily generated in the photo-alignment film 40 by visible light such as light from the backlight 80, and chemical bonding between these radicals and the radicals at ends of the PSA polymer can effectively be formed. Thus, in order to effectively bond the photo-reactive group-containing polymer to the PSA polymer, the photo-reactive functional groups of the photo-reactive group-containing polymer are each preferably an azobenzene, chalcone, or cinnamate group.

Patent Literature 1 also fails to disclose a chemical bond between the photo-alignment film 40 and the polymer layer 50.

In order to effectively reduce transfer of radicals to liquid crystal molecules, the thickness of the polymer layer 50 is preferably large. Specifically, the thickness is preferably 5 nm or greater, still more preferably 10 nm or greater, particularly preferably 20 nm or greater. In order to increase the thickness of the polymer layer 50, the concentration of the bifunctional monomer (2) introduced into the liquid crystal composition needs to be high. However, when the concentration is increased, unreacted monomers may remain in the liquid crystal layer 30 or unreacted monomers may directly be introduced into the polymer layer 50. In such cases, the reliability seems to be reduced. Therefore, in terms of the reliability of the liquid crystal display device of the present embodiment, the thickness of the polymer layer 50 is preferably 100 nm or smaller, more preferably 50 nm or smaller, particularly preferably 25 nm or smaller.

The liquid crystal layer 30 may be any layer containing at least one type of liquid crystal molecules. It typically contains a thermotropic liquid crystal, preferably contains nematic-phase liquid crystal molecules (nematic liquid crystal), and the liquid crystal layer 40 preferably exhibits a nematic phase. The liquid crystal molecules may have negative anisotropy of dielectric constant (Δε) defined by the following formula (P), or may have a positive value thereof. In other words, the liquid crystal molecules may have negative anisotropy of dielectric constant or may have positive anisotropy of dielectric constant. The liquid crystal molecules having negative anisotropy of dielectric constant may be those having a Δε of −1 to −20. The liquid crystal molecules having positive anisotropy of dielectric constant may be those having a Δε of 1 to 20. Further, the liquid crystal layer 30 may contain liquid crystal molecules having no polarity, in other words, having a Δε of substantially 0 (neutral liquid crystal molecules). The neutral liquid crystal molecules may be liquid crystal molecules having an alkene structure.

Δε=(dielectric constant in major axis direction)−(dielectric constant in minor axis direction) (P)

In conventional liquid crystal display devices, liquid crystal molecules having negative anisotropy of dielectric constant tend to cause defects such as image sticking and stain in a more significant manner than liquid crystal molecules having positive anisotropy of dielectric constant. This is presumably because liquid crystal molecules having negative anisotropy of dielectric constant show a greater polarization in the minor axis direction so that the influence of VHR reduction becomes greater when ionization occurs. In other words, the liquid crystal display device of the present embodiment can exert better effects in the case of using a liquid crystal material having negative anisotropy of dielectric constant than in the case of using a liquid crystal material having positive anisotropy of dielectric constant.

The seal 60 is disposed so as to surround the liquid crystal layer 30. The material (sealant) of the seal 60 may be an epoxy resin containing an inorganic or organic filler and a curing agent, for example.

Preferred examples of the alignment mode (display mode) of the liquid crystal display device include, but are not limited to, the twisted nematic (TN) mode, the electrically controlled birefringence (ECB) mode, the in-plane switching (IPS) mode, the fringe field switching (FFS) mode, the vertical alignment (VA) mode, and the twisted nematic vertical alignment (VATN) mode.

When the alignment mode is a horizontal alignment mode, radicals are easily generated from the photo-alignment film, and thus the effects of the invention can significantly be achieved. In other words, photo-alignment treatment (polarized UV irradiation) of a vertical alignment mode can be achieved only by slightly shifting the pre-tilt angle from 90°, but photo-alignment treatment of a horizontal alignment mode requires more precise control of the azimuth (the direction in the plane of the substrate) of the liquid crystal alignment. Thus, the dose in the photo-alignment treatment for a horizontal alignment mode is typically one or more digits greater than that for vertical alignment modes, and more radicals are generated by side reactions than in the case of vertical alignment modes. In contrast, the polymer layer 50 in the present embodiment can effectively reduce dissolution of radicals generated during the photo-alignment treatment in the liquid crystal layer 30. From this viewpoint, the photo-alignment film 40 is preferably one that substantially horizontally aligns liquid crystal molecules in the liquid crystal layer 30. The alignment mode of the liquid crystal display device of the present embodiment is preferably the TN mode, the IPS mode, or the FFS mode.

In the FFS mode, at least one of the substrate 10 and 20 is provided with a structure (FFS electrode structure) including a planar electrode, a slit electrode, and an insulating layer disposed between the planar electrode and the slit electrode, and an oblique electric field (fringe electric field) is formed in the liquid crystal layer 30. Typically, the slit electrode, the insulating layer, and the planar electrode are arranged in this order from the liquid crystal layer 30 side. The slit electrode may be one including linear openings as slits which are completely surrounded by the electrode portions or may be a comb-shaped one including multiple comb-teeth portions and linear cuts as slits between the comb-teeth portions, for example.

In the IPS mode, at least one of the substrates 10 and 20 is provided with paired comb-shaped electrodes, and a transverse electric field is formed in the liquid crystal layer 30. The paired comb-shaped electrodes may be paired electrodes each of which is provided with multiple comb-teeth portions and is disposed such that the comb-shaped portions of the respective electrodes are engaged with each other.

In the VATN mode, one of the substrates 10 and 20 is provided with a pixel electrode while the other of the substrates 10 and 20 is provided with a common electrode, and a vertical electric field is formed in the liquid crystal layer 30. The photo-alignment films 40 on the respective substrates 10 and 20 are vertical alignment films, and the alignment treatment directions thereof are perpendicular to each other. In the VATN mode, photo-alignment treatment is preferred because the pre-tilt angle needs to be highly precisely controlled.

The substrates 10 and 20 each may be provided with a polarizer (linear polarizer) 70 on the side opposite to the liquid crystal layer 30. Typical examples of the polarizer 70 include those obtained by aligning a dichroic anisotropic material such as an iodine complex adsorbed on a polyvinyl alcohol (PVA) film. Generally, each surface of the PVA film is laminated with a protective film such as a triacetyl cellulose film before the film is put into practical use. An optical film such as a retardation film may be disposed between the polarizer 70 and each of the substrates 10 and 20.

As illustrated in FIG. 2, the liquid crystal display device of the present embodiment is provided with the backlight 80 on the back side of the liquid crystal panel. A liquid crystal display device with such a structure is usually called a transmissive liquid crystal display device. The backlight 80 may be any backlight that emits light including visible light, and may be one that emits light including only visible light or emits light including both visible light and ultraviolet light. In order to enable the liquid crystal display device to provide color display, the backlight 80 preferably emits white light. The light source of the backlight 80 may suitably be a light emitting diode (LED), for example. The "visible light" as used herein means light (electromagnetic waves) having a wavelength of 380 nm to shorter than 800 nm.

One main feature of the present embodiment is that dissolution of radicals generated from the photo-alignment films 40 due to exposure to the light from the backlight 80 in the liquid crystal layer 30 is reduced by the polymer layers 50. Thus, the polymer layers 50 can particularly effectively function when at least part of the emission spectrum of the backlight 80 overlaps at least part of the absorption spectrum of the photo-alignment films 40.

The liquid crystal display device of the present embodiment has a structure including, as well as the liquid crystal panel and the backlight 80, components such as external circuits, including a tape-carrier package (TCP) and a printed circuit board (PCB); optical films, including a viewing angle-increasing film and a luminance-increasing film; and a bezel (frame). Some components may be incorporated into another component. In addition to the components described above, the liquid crystal display device may include any components that are usually used in the field of liquid crystal display devices. The additional components are therefore not described herein.

<Method for Manufacturing Liquid Crystal Display Device>

Next, a method for manufacturing the liquid crystal display device of the present embodiment is described.

The method for manufacturing the liquid crystal display device of the present embodiment includes: preparing the paired substrates 10 and 20; forming the photo-alignment films 40 each containing a polymer that contains photo-reactive functional groups on the respective substrates 10 and 20; forming the liquid crystal layer 30 between the substrates 10 and 20 each of which is provided with the photo-alignment film 40; and thermally polymerizing a monomer represented by the formula (2) (bifunctional monomer (2)) using a polymerization initiator represented by the formula (1) (polymerization initiator (1)) to form the polymer layers 50 between the liquid crystal layer 30 and the respective photo-alignment films 40.

The method for manufacturing the liquid crystal display device of the present embodiment includes forming the polymer layers 50 between the liquid crystal layer 30 and the respective photo-alignment films 40, which can reduce the region (area) where photo-reactive functional groups in the photo-alignment films 40 and liquid crystal molecules in the liquid crystal layer 30 are in direct contact with each other. Therefore, even when ultraviolet light or visible light from the backlight 80 generates radicals from photo-reactive functional groups in the photo-alignment films 40, transfer of radicals to liquid crystal molecules can be reduced. This also applies to the cases in a high-temperature environment.

Since the polymer layers are formed by thermally polymerizing the bifunctional monomer (2) using the polymerization initiator (1), the liquid crystal layer 30 is not required to be irradiated with light in forming the polymer layers 50. Therefore, generation of radicals from the photo-alignment films 40 can be reduced in forming the polymer layers 50. In contrast, if a monomer is photo-polymerized to form a polymer layer, radicals are generated from photo-reactive functional groups (in particular, photo-reactive functional groups that absorb light with a wavelength of 360 nm or longer) of the photo-alignment films during the formation thereof, and the radicals are transferred to liquid crystal molecules, causing a reduction in VHR.

If a typical thermal polymerization initiator is used and part of it remains unreacted after the completion of thermal polymerization, radicals are generated from the unreacted part of the thermal polymerization initiator and some of the radicals are ionized during the use of a liquid crystal display device, reducing the VHR. In contrast, the polymerization initiator (1) is a polymerizable group-containing polymerization initiator in which a polymerizable group ($P^1$) is attached to the respective sides of the azo group. Thus, the initiator can be introduced into the PSA polymer even when it fails to contribute to the start of the polymerization during the thermal polymerization, reducing the amount of unreacted part of the polymerization initiator (1) remaining in the liquid crystal layer 30. Therefore, radicals due to an unreacted part of the polymerization initiator (1) can be reduced.

In the case of adding a radical scavenger to the liquid crystal layer, the additive may remain in the liquid crystal layer, so that thermal reaction of the additive may occur and the physical properties of the liquid crystal material may slightly change. In contrast, the present embodiment reduces remaining of additives such as the bifunctional monomer (2) and the polymerization initiator (1) in the liquid crystal layer 30, and thus can reduce occurrence of new thermal reactions of the additives and can reduce changes in the physical properties of the liquid crystal material.

Patent Literature 1 discloses in the paragraph [0057] that a polymerization initiator may be used in order to promote polymerization of a polymerizable compound added to a liquid crystal composition, but does not disclose the polymerization initiator (1). The polymerization initiators disclosed in the paragraph [0057] of Patent Literature 1 each generate radicals by both light and heat. Thus, when remaining in the liquid crystal layer, such polymerization initiators seem to cause a reduction in reliability due to generation of radicals. In contrast, the polymerization initiator (1) of the present embodiment is likely to generate radicals due to heat but hardly generates radicals due to light, although it requires temperature control of the liquid crystal material.

Further, many polymerization initiators including any of the polymerization initiators disclosed in Patent Literature 1 contain no polymerizable group in the molecule, and unreacted part of the polymerization initiator remains in the liquid crystal layer. Also, in this respect, these polymerization initiators are different from the polymerization initiator (1) of the present embodiment. As mentioned above, the polymerization initiator (1) contains two polymerizable groups (on the respective sides of the azo group) in one molecule. Thus, the polymerization initiator (1) can contribute to the polymerization even when it fails to contribute to the start of the polymerization. Therefore, remaining of unreacted part of the polymerization initiator (1) in the liquid crystal layer 30 can be reduced even when the initiator fails to contribute to the start of the polymerization.

As described above, the method for manufacturing the liquid crystal display device of the present embodiment includes forming the photo-alignment films 40 each containing a polymer that contains photo-reactive functional groups, and further includes thermally polymerizing the bifunctional monomer (2) using the polymerization initiator (1) to form the polymer layers 50 between the liquid crystal layer 30 and the respective photo-alignment films 40. This can reduce transfer of radicals to liquid crystal molecules and generation itself of radicals. As a result, the method can provide a liquid crystal display device capable of maintaining a favorable voltage holding ratio and reducing occurrence of image sticking and stain and a decrease in contrast ratio in a high-temperature environment for a long time.

The steps are described in more detail below. The components are as described above, and thus are not described below.

In the formation of the photo-alignment films, first, a polymer (photo-reactive group-containing polymer) containing photo-reactive functional groups (preferably, azobenzene, chalcone, or cinnamate groups) is dissolved in a solvent (e.g., an organic solvent) to prepare a liquid crystal alignment agent. The photo-reactive group-containing polymer is preferably a polyamic acid, a polyimide, a polysiloxane, a polyvinyl, or polymaleimide, as described above. The liquid crystal alignment agent may contain other additional components, if necessary. Preferably, the liquid crystal alignment agent is prepared as a solution-like composition containing the components dissolved in a solvent. The organic solvent is preferably one that dissolves the photo-reactive group-containing polymer and the additional components but does not react therewith. Examples of the additional components include polymers other than the photo-reactive group-containing polymers, curing agents, curing accelerators, and catalysts. Polymers other than the photo-reactive group-containing polymers may be used in order to further improve the solution characteristics of the liquid crystal alignment agent and the electric properties of the alignment films. Examples of such polymers include polymers for typical alignment films containing no photo-reactive functional group.

Next, the liquid crystal alignment agent is applied to the surfaces of the substrates 10 and 20. Examples of the application technique include, but are not limited to, a roll coater technique, a spinner technique, a printing technique, or an ink-jet technique.

Next, the substrates 10 and 20 are heated. Thereby, the solvent in the liquid crystal alignment agent is evaporated and the photo-alignment films 40 are formed. Heating may be performed in two stages of pre-baking and post-baking. When the liquid crystal alignment agent contains a photo-reactive functional group-free polymer for an alignment film, the resulting photo-alignment films 40 each may have a bilayer structure, and may have a lower layer mainly formed of a photo-reactive functional group-free polymer for an alignment film and an upper layer mainly formed of a photo-reactive group-containing polymer. The upper layer is to be in contact with the liquid crystal layer.

Next, the photo-alignment films 40 are subjected to photo-alignment treatment so that a desired alignment-controlling force is given to the photo-alignment films 40. Specifically, the photo-alignment films 40 are irradiated with (exposed to) light such as ultraviolet light or visible light. As a result, the aforementioned structural change occurs in photo-reactive functional groups of the photo-reactive group-containing polymer, and at least part of the molecular structure and/or alignment of the photo-reactive group-containing polymer are/is changed. Then, the photo-alignment films 40 are allowed to control the alignment of liquid crystal molecules in contact with the surfaces thereof. In general, the structural change does not occur in all of the photo-reactive functional groups. Thus, at least some of the photo-reactive functional groups remain in the photo-alignment films 40 even after the photo-alignment treatment.

The light used in the photo-alignment treatment may be ultraviolet light, visible light, or both of them. The light used in the photo-alignment treatment may be either polarized light or non-polarized light. For example, the light may be polarized light such as linearly polarized light, elliptically polarized light, or circularly polarized light, or non-polarized light. In particular, the photo-alignment films 40 are preferably irradiated with polarized ultraviolet light, which enables easy and highly precise control of the azimuth and pre-tilt angle of the liquid crystal alignment.

The photo-alignment films 40 are each preferably a photo-alignment film that substantially horizontally aligns liquid crystal molecules in the liquid crystal layer 30 by polarized light irradiation or a photo-alignment film that substantially vertically aligns liquid crystal molecules in the liquid crystal layer 30 by polarized light irradiation.

The photo-alignment film 40 may be formed on only one of the substrates 10 and 20. Division alignment treatment may be performed for multi-domain formation.

In the formation of the liquid crystal layer, first, at least one polymerization initiator (1) and at least one bifunctional monomer (2) are added to liquid crystal material containing at least one type of liquid crystal molecules to prepare a liquid crystal composition.

The concentration of the polymerization initiator (1) in the whole liquid crystal composition is preferably 0.0001 wt % or more and 0.05 wt % or less. Less than 0.0001 wt % of the polymerization initiator (1) may fail to start the polymerization reaction effectively. More than 0.05 wt % thereof may cause remaining of an unreacted part of the polymerization initiator. The concentration of the polymerization initiator (1) in the whole liquid crystal composition is more preferably 0.001 wt % or more and 0.02 wt % or less.

The concentration of the bifunctional monomer (2) in the whole liquid crystal composition is preferably 0.1 wt % or more and 1 wt % or less. Less than 0.1 wt % of the bifunctional monomer (2) may cause a failure in forming the polymer layers 50 from the PSA polymer on the entire photo-alignment films 40. More than 1 wt % thereof may cause remaining of an unreacted part of the monomer, easily generating image sticking and stain. The concentration of the bifunctional monomer (2) in the whole liquid crystal composition is more preferably 0.2 wt % or more and 0.5 wt % or less.

Next, the liquid crystal composition is placed between the substrates 10 and 20 by vacuum filling or one drop filling to form a liquid crystal layer 30. As described above, the liquid crystal layer 30 preferably contains a liquid crystal material having negative anisotropy of dielectric constant. In the case of vacuum filling, application of a sealant, attachment of the substrates 10 and 20, curing of the sealant, filling with the liquid crystal composition, and sealing of the filling port are performed in this order. In the case of one drop filling, application of a sealant, dropping of the liquid crystal composition, attachment of the substrates 10 and 20, and curing of the sealant are performed in this order. As a result, a liquid crystal cell filled with the liquid crystal composition is formed.

In the formation of the polymer layer, the liquid crystal layer 30 is heated so that the polymerization initiator (1) is decomposed to generate radicals. As a result, radical polymerization (thermal polymerization) of the bifunctional monomer (2) is initiated in the liquid crystal layer 30 and the PSA polymer is generated. Finally, the PSA polymer is phase-separated from the liquid crystal layer 30, and the polymer layers 50 each containing the PSA polymer are formed between the liquid crystal layer 30 and the respective photo-alignment films 40.

The thermal polymerization may be performed under any heating conditions, such as heating temperature, heating time, and heating means, and is preferably performed at a temperature that is lower than the nematic-isotropic transition temperature of the liquid crystal material in the liquid crystal layer 30 and is not lower than the radical-generating temperature of the polymerization initiator (1). A heating temperature that is lower than the nematic-isotropic transition temperature can provide an effect of stabilizing the liquid crystal alignment. A heating temperature that is not lower than the radical-generating temperature of the polymerization initiator (1) enables effective initiation of the polymerization reaction.

The nematic-isotropic transition temperature of the liquid crystal material as used herein can be determined by differential scanning calorimetry (DSC) or by a technique of directly measuring the phase transition due to temperature change with the liquid crystal material placed in a capillary. The radical-generating temperature of the polymerization initiator (1) can be determined by differential scanning calorimetry or by temperature-dependent measurement utilizing electron spin resonance (RSR).

The formation of the polymer layer is typically followed by re-alignment treatment of the liquid crystal layer 30. Specifically, the liquid crystal layer 40 is heated at a temperature higher than the nematic-isotropic transition temperature of the liquid crystal material in the liquid crystal layer 30, and then cooled down to room temperature. Thereby, flow alignment of liquid crystal molecules is removed and the liquid crystal molecules are aligned along the molecular structure of the photo-alignment films 40, so that the liquid crystal layer 30 exhibits a desired alignment state.

The above steps are followed by attachment of polarizers and attachment of components such as a control unit, a power supply unit, and a backlight. Thereby, the liquid crystal display device of the present embodiment is completed.

The alignment mode (display mode) of the resulting liquid crystal display device is preferably the TN mode, the ECB mode, the IPS mode, the FFS mode, the VA mode, or the VATN mode, as described above.

In the method for manufacturing the liquid crystal display device of the present embodiment, the polymer (photo-reactive group-containing polymer) contained in each photo-alignment film 40 and the polymer (PSA polymer) contained in the corresponding polymer layer 50 are preferably bonded to each other by light irradiation and/or heating. This can reduce dissolution of the PSA polymer in the liquid crystal layer 30 and further improve the long-term reliability of the liquid crystal display device to be produced. In order to effectively bond the photo-reactive group-containing polymer and the PSA polymer as described above, the photo-reactive functional groups of the photo-reactive group-containing polymer are preferably functional groups that absorb light with a wavelength of 360 nm or longer, specifically azobenzene, chalcone, or cinnamate groups, and the light to be applied is preferably visible light.

The formation of a bond by light irradiation may be performed at any timing after the formation of the polymer layers. For example, the bond may be formed during aging which is performed with the backlight turned on. This bonding between the photo-reactive group-containing polymer and the PSA polymer may be formed during the use of the liquid crystal display device.

The formation of a bond by heating may be performed at any timing during or after the formation of the polymer layers. For example, the PSA polymer may be bonded to the photo-alignment film polymer simultaneously with the formation of the polymer layers 50 in the formation of the polymer layers. Alternatively, the PSA polymer may be bonded to the photo-alignment film polymer in the re-alignment treatment for removing flow alignment of the liquid crystal. The bonding may be performed under any heating conditions, such as heating temperature, heating time, and heating means, and the heating temperature is preferably not lower than the radical-generating temperature of the polymerization initiator (1).

Each and every detail described for the above embodiment of the present invention shall be applied to all the aspects of the present invention.

The present invention is described below in more detail based on examples and comparative examples. The examples, however, are not intended to limit the scope of the present invention.

Synthesis Example 1

An N,N-dimethylformamide (DMF) solution (3 mL) containing 10 g (35.7 mmol) of 4,4'-azobis(4-cyanovaleric acid) represented by the following formula (a) was dropwise added to thionyl chloride (10 mL), and the components were stirred at 0° C. for four hours. The thionyl chloride was then removed under reduced pressure, and thereby a solid powder of 4,4'-azobis(4-cyanovaleric acid chloride) represented by the following formula (b) was obtained. The solid powder of the following formula (b) was dissolved in 300 mL of dried tetrahydrofuran (THF). Thereto was added 100 mL of a dried THF solution containing 4.5 g (31 mmol) of hydroxypropyl methacrylate represented by the following formula (c) and 4 g (51 mmol) of pyridine, and the components were stirred at 0° C. for five hours. Then, the THF was removed and the resulting crude crystal was dissolved in diethyl ether. The solution was washed with an aqueous solution of sodium hydrogen carbonate, followed by anhydrous sodium sulfate. The solvent was then removed and the residue was recrystallized with a solvent mixture of diethyl ether/methanol (1:1). Thereby, 2.1 g (3.95 mmol, yield: 12.7%) of the target compound represented by the following formula (d) was obtained.

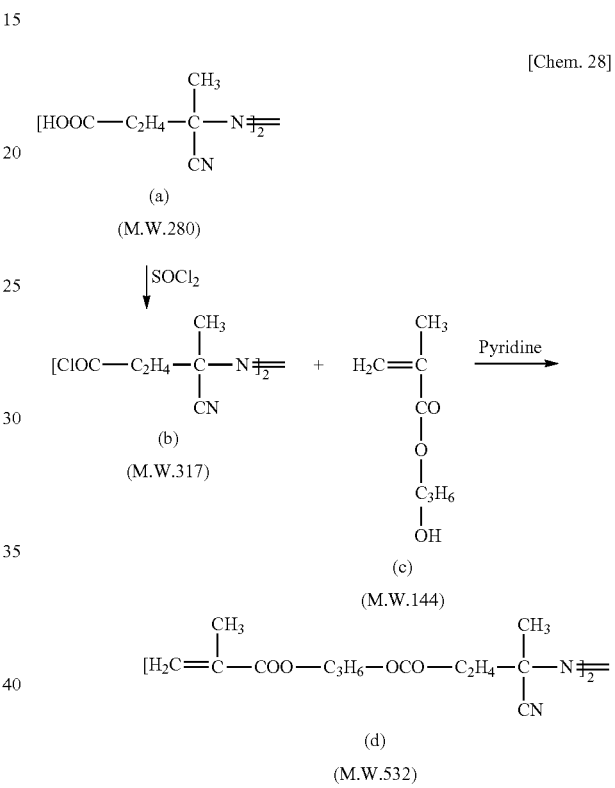

Example 1

An FFS-mode liquid crystal cell was actually produced as follows.

First, an ITO substrate provided with an FFS electrode structure formed of indium tin oxide (ITO) and a counter substrate provided with no electrode were prepared. Also, a liquid crystal alignment agent was prepared containing a polyamic acid (initial chemical imidization rate: 0%) that is represented by the following formula (A-1) and contains an azobenzene group in the main chain and a polyamic acid (initial chemical imidization rate: 0%) that contains no azobenzene group. In the polyamic acid represented by the following formula (A-1), X4 is a structure represented by the following formula (X4-1); and Y4 is an azobenzene group-containing unit represented by the following formula (Y4-1) or a unit represented by the following formula (Y4-2), with the azobenzene group-containing unit represented by the following formula (Y4-1) and the unit represented by the following formula (Y4-2) being introduced at a ratio of 1:1. The polyamic acid containing no azobenzene group is also represented by the following formula (A-1). Still, a unit represented by the following formula (Y4-2) alone is introduced as Y4 and no azobenzene group-containing unit represented by the following formula (Y4-1) is introduced.

[Chem. 29]

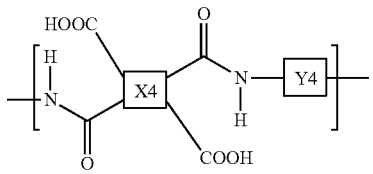

(A-1)

[Chem. 30]

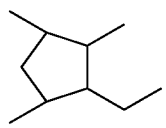

(X4-1)

[Chem. 31]

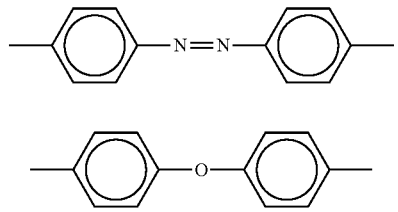

(Y4-1)

(Y4-2)

The resulting liquid crystal alignment agent was applied to both the ITO substrate and the counter substrate, and the workpieces were pre-baked at 90° C. for five minutes. Then, the surfaces covered with the liquid crystal alignment agent were irradiated with 2 J/cm² of linearly polarized ultraviolet light with a center wavelength of 365 nm, so that alignment treatment was performed. The workpieces were then post-baked at 230° C. for 40 minutes, and thereby bilayer-structured photo-alignment films were obtained. Each bilayer-structured photo-alignment film consists of a lower layer formed from a polyamic acid containing no photo-reactive functional group and an upper layer formed from a polyamic acid containing photo-reactive functional groups (azobenzene groups), and the upper layer is in contact with the liquid crystal layer.

Next, an ultraviolet-curable sealant (trade name: Photolec S-WB, Sekisui Chemical Co., Ltd.) was applied in a pattern to one of the substrates using a dispenser. A negative liquid crystal composition was dropped on a predetermined position of the other substrate. The negative liquid crystal composition contains a liquid crystal material, as well as 0.005 wt % of a polymerizable group-containing polymerization initiator represented by the following formula (A-2) and 0.25 wt % of a bifunctional monomer represented by the following formula (A-3). The substrates were then attached to each other in a vacuum and the sealant was irradiated with ultraviolet light with the display area shielded from the light, so that the sealant was cured. Thereby, a liquid crystal cell was produced.

[Chem. 32]

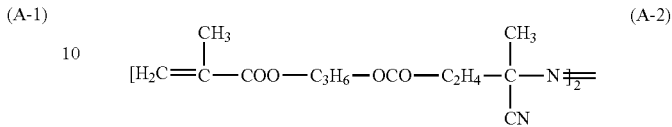

(A-2)

[Chem. 33]

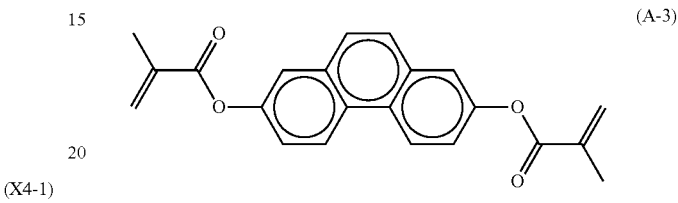

(A-3)

Next, the liquid crystal cell was heated at 60° C. (a temperature lower than the nematic-isotropic transition temperature of the liquid crystal material and not lower than the minimum temperature at which the polymerizable group-containing polymerization initiator represented by the formula (A-2) generates radicals) for 120 minutes. Thereby, polymer layers were formed by thermal polymerization. In order to remove flow alignment of the liquid crystal, the liquid crystal cell was further heated at 130° C. (a temperature higher than the nematic-isotropic transition temperature of the liquid crystal material) for 40 minutes so that re-alignment treatment was performed to convert the liquid crystal into an isotropic phase. The liquid crystal cell was cooled down to room temperature, and thereby an FFS-mode liquid crystal cell was obtained. The nematic-isotropic transition temperature of the liquid crystal material in the present example is 75° C. The minimum temperature (corresponding to the radical-generating temperature) at which the polymerizable group-containing polymerization initiator represented by the formula (A-2) generates radicals is about 55° C.

Comparative Example 1

An FFS-mode liquid crystal cell of Comparative Example 1 was produced in the same manner as in Example 1, except that a negative liquid crystal composition different from that in Example 1 was used and the formation of polymer layers by thermal polymerization was not performed. The negative liquid crystal composition used in the present comparative example was the same as that used in Example 1, except that neither the polymerizable group-containing polymerization initiator represented by the formula (A-2) nor the bifunctional monomer represented by the formula (A-3) was introduced.

Comparative Example 2

An FFS-mode liquid crystal cell of Comparative Example 2 was produced in the same manner as in Example 1, except that a negative liquid crystal composition different from that in Example 1 was used and the formation of polymer layers by thermal polymerization was not performed. The negative liquid crystal composition used in the present comparative example was the same as that used in Example 1, except that 0.001 wt % of a nitroxy radical scavenger was introduced instead of the polymerizable group-containing polymerization initiator represented by the formula (A-2) and the bifunctional monomer represented by the formula (A-3).

Comparative Example 3

An FFS-mode liquid crystal cell of Comparative Example 3 was produced in the same manner as in Example 1, except that a negative liquid crystal composition different from that in Example 1 was used. The negative liquid crystal composition used in the present comparative example was the same as that used in Example 1, except that 0.005 wt % of a polymerizable group-free polymerization initiator represented by the following formula (A-4) was introduced instead of the polymerizable group-containing polymerization initiator represented by the formula (A-2). The minimum temperature (corresponding to the radical-generating temperature) at which the polymerizable group-free polymerization initiator represented by the formula (A-4) generates radicals is about 55° C.

[Chem. 34]

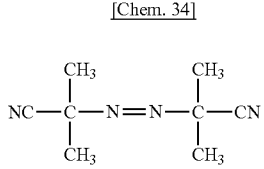

(A-4)

Comparative Example 4

An FFS-mode liquid crystal cell of Comparative Example 4 was produced in the same manner as in Example 1 except for the following points. In the present comparative example, a photo-polymerization initiator (trade name: Irgacure® 651, BASF) was used instead of the polymerizable group-containing polymerization initiator represented by the formula (A-2). In the present comparative example, the liquid crystal cell was irradiated with 2 J/cm² of ultraviolet light using an ultraviolet lamp (Toshiba Lighting & Technology Corp.) instead of the heating at 60° C. for 120 minutes as in Example 1 in the formation of the polymer layers by polymerization.

Comparative Example 5

An FFS-mode liquid crystal cell of Comparative Example 5 was produced in the same manner as in Example 1 except for the following points. In the present comparative example, an alignment film was formed using a liquid crystal alignment agent that does not contain a polyamic acid represented by the formula (A-1) and containing an azobenzene group in the main chain but contains a polyamic acid (initial chemical imidization rate: 0%) containing no azobenzene group. As described above, this polyamic acid is as represented by the formula (A-1), and it does not contain an azobenzene group-containing unit represented by (Y4-1) but contains a unit represented by (Y4-2) alone as Y4. In the present comparative example, rubbing treatment was performed instead of the photo-alignment treatment.

Comparative Example 6

An FFS-mode liquid crystal cell of Comparative Example 6 was produced in the same manner as in Comparative Example 5, except that a negative liquid crystal composition different from that in Comparative Example 5 was used and the formation of polymer layers by thermal polymerization was not performed. The negative liquid crystal composition used in the present comparative example was the same as that used in Comparative Example 5, except that neither the polymerizable group-containing polymerization initiator represented by the formula (A-2) nor the bifunctional monomer represented by the formula (A-3) was introduced.

<High-Temperature Test on Backlight>

In order to evaluate the heat resistance of the FFS-mode liquid crystal cells produced in Example 1 and Comparative Examples 1 to 6, each liquid crystal cell was left to stand for 5000 hours on a backlight in a turn-on state with the temperature of the liquid crystal cell increased up to 75° C. The voltage holding ratio (VHR) and the contrast ratio were determined before and after the test. The results are shown in the following Table 1. The VHR was determined at 1 V and 70° C. using a VHR measurement system Model 6254 (Toyo Corp.). The contrast ratio was determined at 25° C. using a spectroradiometer "SR-UL1R" (Topcon Technohouse Corp.).

TABLE 1

|  | Before test | | After 5000-hour test | |
|---|---|---|---|---|
|  | VHR (%) | Contrast ratio | VHR (%) | Contrast ratio |
| Example 1 | 98.4 | 1100 | 95.3 | 1030 |
| Comparative Example 1 | 99.3 | 1100 | 84.3 | 810 |
| Comparative Example 2 | 99.2 | 1000 | 94.5 | 940 |
| Comparative Example 3 | 97.3 | 1030 | 89.5 | 860 |
| Comparative Example 4 | 85.3 | 800 | 76.4 | 750 |
| Comparative Example 5 | 99.0 | 850 | 96.6 | 780 |
| Comparative Example 6 | 99.0 | 850 | 98.0 | 800 |

As shown in Table 1, the results of Example 1 demonstrate that the polymer layers formed by thermal polymerization using the polymerizable group-containing polymerization initiator represented by the formula (A-2) allowed the VHR and the contrast ratio to be maintained at high levels after the 5000-hour test in comparison with Comparative Example 1. Thus, the polymer layers seem to effectively reduce transfer of radicals generated in the azobenzene group-containing photo-alignment films to the negative liquid crystal material, consequently reducing decreases in VHR and contrast ratio.

In contrast, Comparative Example 2 where a conventional nitroxy radical scavenger was introduced into the liquid crystal composition actually achieved an effect of reducing decreases in VHR and contrast ratio after the 5000-hour test, but the contrast ratio was initially low. This is presumably because the radical scavenger can freely diffuse in the liquid crystal layer, consequently increasing the alignment fluctuation of the liquid crystal and slightly reducing the contrast ratio.

In Comparative Example 3 where a polymerizable group-free polymerization initiator was used, the VHR was initially low. Although a desired effect was observed after the 5000-hour test in comparison with the cases without a polymer layer, a greater reduction in VHR was observed than in Example 1. This is presumably because an unreacted part of the polymerization initiator remained in the liquid crystal layer to cause a low initial VHR and the unreacted part of the polymerization initiator remaining in the liquid crystal layer was converted into radicals during the test to cause a further reduction in VHR.

In Comparative Example 4 where a photo-polymerization initiator was used, the VHR was as low as the 80% range and the contrast ratio was as low as 800 in an early stage (before the test). This is presumably because ultraviolet irradiation for the formation of the polymer layers caused generation of radicals from the photo-functional groups of the photo-alignment films and ionization thereof. The 5000-hour test caused further decreases in VHR and contrast ratio.

In Comparative Examples 5 and 6 where rubbed alignment films were used, the contrast ratio was lower than 1000 even in an early stage (before the test), but the VHR was high. Decreases in VHR and contrast ratio were small after the 5000-hour test. However, with rubbed alignment films, the results were hardly changed by the presence or absence of the polymer layers. The formation of the polymer layers showed no effect.

Example 2

An FFS-mode liquid crystal cell of Example 2 was produced in the same manner as in Example 1, except that a polyamic acid (initial chemical imidization rate: 0%) represented by the formula (A-1) and containing an azobenzene group in the main chain (not containing a unit represented by (Y4-2) but containing an azobenzene group-containing unit represented by (Y4-1) alone as Y4) was used instead of the polyamic acid used in Example 1.

<High-Temperature Test on Backlight>

For the FFS-mode liquid crystal cell produced in Example 2, the same evaluation test as in Example 1 and other examples were performed. The results are shown in the following Table 2.

TABLE 2

|  | Before test | | After 5000-hour test | |
| --- | --- | --- | --- | --- |
|  | VHR (%) | Contrast ratio | VHR (%) | Contrast ratio |
| Example 2 | 98.1 | 1150 | 96.5 | 1060 |
| Example 1 | 98.4 | 1100 | 95.3 | 1030 |

As shown in Table 2, the amount of the azobenzene groups which are photo-reactive functional groups of the polyamic acid-based photo-alignment films in Example 2 was double the amount thereof in Example 1. In comparison with Example 1, the VHR and the contrast ratio were higher after the test. These results seem to demonstrate that bonds are more effectively formed by reactions between radicals generated from azobenzene groups and end radicals of the polymer in the polymer layers than in Example 1, further reducing dissolution of the polymer in the polymer layers.

Example 3

An IPS-mode liquid crystal cell was actually produced as follows.

First, a substrate provided with a comb-shaped electrode formed of indium tin oxide (ITO) and a counter substrate with no electrode were prepared. Also, a liquid crystal alignment agent containing a polyvinyl-based polymer that contains a chalcone group and a carboxyl group and polyimide was prepared. The polyvinyl-based polymer is represented by the following formula (B-1).

[Chem. 35]

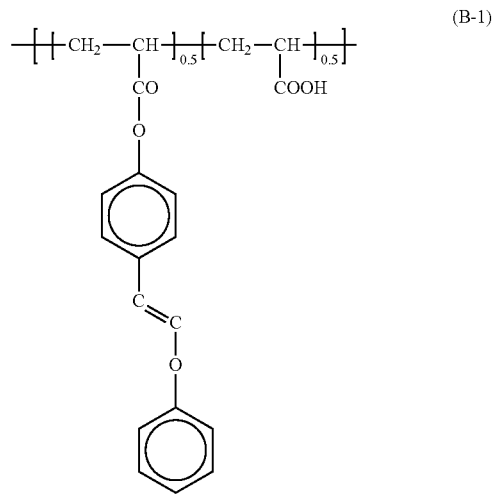

(B-1)

The resulting liquid crystal alignment agent was applied to both the substrate provided with the comb-shaped electrode and the counter substrate, and the workpieces were pre-baked at 90° C. for five minutes. The workpieces were then post-baked at 200° C. for 40 minutes, and thereby bilayer-structured photo-alignment films were obtained. Then, the surfaces covered with the photo-alignment films were irradiated with 2 J/cm$^2$ of linearly polarized ultraviolet light with a center wavelength of 365 nm, so that alignment treatment was performed. Each bilayer-structured photo-alignment film consists of a lower layer formed from polyimide and an upper layer formed from a polyvinyl-based polymer containing photo-reactive functional groups (chalcone groups), and the upper layer is in contact with the liquid crystal layer.

Next, an ultraviolet-curable sealant (trade name: Photolec S-WB, Sekisui Chemical Co., Ltd.) was applied in a pattern to one of the substrates using a dispenser. A negative liquid crystal composition was dropped on a predetermined position of the other substrate. The negative liquid crystal composition contains a liquid crystal material, as well as 0.005 wt % of a polymerizable group-containing polymerization initiator represented by the following formula (B-2) and 0.25 wt % of a bifunctional monomer represented by the following formula (B-3). The substrates were then attached to each other in a vacuum and the sealant was irradiated with ultraviolet light with the display area shielded from the light, so that the sealant was cured. Thereby, a liquid crystal cell was produced.

[Chem. 36]

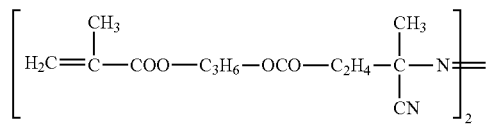

(B-2)

[Chem. 37]

(B-3)

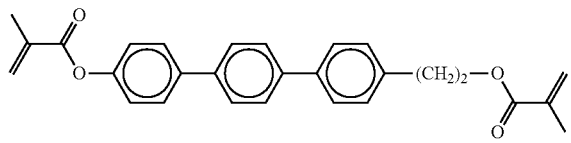

Next, the liquid crystal cell was heated at 60° C. (a temperature lower than the nematic-isotropic transition temperature of the liquid crystal material and not lower than the minimum temperature at which the polymerizable group-containing polymerization initiator represented by the formula (B-2) generates radicals) for 120 minutes. Thereby, polymer layers were formed by thermal polymerization. In order to remove flow alignment of the liquid crystal, the liquid crystal cell was further heated at 130° C. (a temperature higher than the nematic-isotropic transition temperature of the liquid crystal material) for 40 minutes so that re-alignment treatment was performed to convert the liquid crystal into an isotropic phase. The liquid crystal cell was cooled down to room temperature, and thereby an IPS-mode liquid crystal cell was obtained. The nematic-isotropic transition temperature of the liquid crystal material in the present example is 75° C. The minimum temperature (corresponding to the radical-generating temperature) at which the polymerizable group-containing polymerization initiator represented by the formula (B-2) generates radicals is about 55° C.

Comparative Example 7

An FFS-mode liquid crystal cell of Comparative Example 7 was produced in the same manner as in Example 3, except that a negative liquid crystal composition different from that in Example 3 was used and the formation of polymer layers by thermal polymerization was not performed. The negative liquid crystal composition used in the present comparative example was the same as that used in Example 3, except that neither the polymerizable group-containing polymerization initiator represented by the formula (B-2) nor the bifunctional monomer represented by the formula (B-3) was introduced.

<High-Temperature Test on Backlight>

For the FFS-mode liquid crystal cells produced in Example 3 and Comparative Example 7, the same evaluation test as in Example 1 and other examples were performed. The results are shown in the following Table 3.

TABLE 3

|  | Before test | | After 5000-hour test | |
| --- | --- | --- | --- | --- |
|  | VHR (%) | Contrast ratio | VHR (%) | Contrast ratio |
| Example 3 | 98.2 | 1200 | 93.8 | 1100 |
| Comparative Example 7 | 98.5 | 1150 | 86.4 | 850 |

As shown in Table 3, the results of Example 3 demonstrate that the polymer layers formed by thermal polymerization using the polymerizable group-containing polymerization initiator represented by the formula (B-2) allowed the VHR and the contrast ratio to be maintained at high levels after the 5000-hour test in comparison with Comparative Example 7. Thus, the polymer layers seem to effectively reduce transfer of radicals generated in the chalcone group-containing photo-alignment films to the negative liquid crystal material, consequently reducing decreases in VHR and contrast ratio.

Example 4

A VATN-mode liquid crystal cell was actually produced as follows.

First, two ITO substrates each provided with an electrode formed from indium tin oxide (ITO) were prepared. Also, a liquid crystal alignment agent containing polysiloxane that contains a cinnamate group and an epoxy group and polyimide was prepared. The polysiloxane is represented by the following formula (C-1). In the polysiloxane represented by the following formula (C-1), 31 is a structure represented by the following formula (C-2).

[Chem. 38]

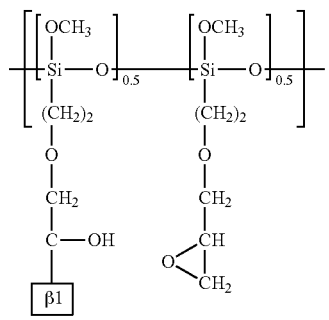

(C-1)

[Chem. 39]

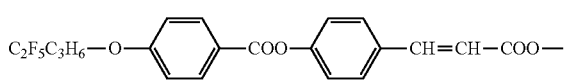

(C-2)

The resulting liquid crystal alignment agent was applied to both of the two ITO substrates, and the workpieces were pre-baked at 90° C. for five minutes. The workpieces were then post-baked at 230° C. for 40 minutes, and thereby bilayer-structured photo-alignment films were obtained. Then, the surfaces covered with the photo-alignment films were irradiated with 20 mJ/cm$^2$ of linearly polarized ultraviolet light with a wavelength range of 320 to 380 nm, so that alignment treatment was performed. Each bilayer-structured photo-alignment film consists of a lower layer formed from polyimide and an upper layer formed from polysiloxane containing photo-reactive functional groups (cinnamate groups), and the upper layer is in contact with the liquid crystal layer.

Next, an ultraviolet-curable sealant (trade name: Photolec S-WB, Sekisui Chemical Co., Ltd.) was applied in a pattern to one of the substrates using a dispenser. A negative liquid crystal composition was dropped on a predetermined position of the other substrate. The negative liquid crystal composition contains a liquid crystal material, as well as 0.005 wt % of a polymerizable group-containing polymerization initiator represented by the following formula (C-3)

and 0.3 wt % of a bifunctional monomer represented by the following formula (C-4). The substrates were then attached to each other in a vacuum and the sealant was irradiated with ultraviolet light with the display area shielded from the light, so that the sealant was cured. Thereby, a liquid crystal cell was produced.

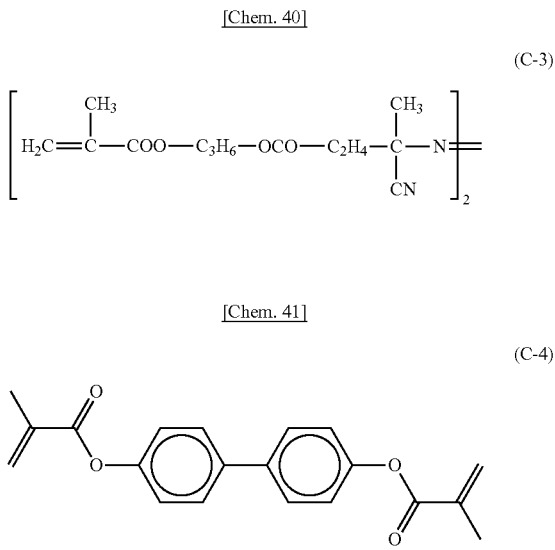

Next, the liquid crystal cell was heated at 60° C. (a temperature lower than the nematic-isotropic transition temperature of the liquid crystal material and not lower than the minimum temperature at which the polymerizable group-containing polymerization initiator represented by the formula (C-3) generates radicals) for 120 minutes. Thereby, polymer layers were formed by thermal polymerization. In order to remove flow alignment of the liquid crystal, the liquid crystal cell was further heated at 130° C. (a temperature higher than the nematic-isotropic transition temperature of the liquid crystal material) for 40 minutes so that re-alignment treatment was performed to convert the liquid crystal into an isotropic phase. The liquid crystal cell was cooled down to room temperature, and thereby a VATN-mode liquid crystal cell was obtained. The nematic-isotropic transition temperature of the liquid crystal material in the present example is 75° C. The minimum temperature (corresponding to the radical-generating temperature) at which the polymerizable group-containing polymerization initiator represented by the formula (C-3) generates radicals is about 55° C.

Comparative Example 8

A VATN-mode liquid crystal cell of Comparative Example 8 was produced in the same manner as in Example 4, except that a negative liquid crystal composition different from that in Example 4 was used and the formation of polymer layers by thermal polymerization was not performed. The negative liquid crystal composition used in the present comparative example was the same as that used in Example 4, except that neither the polymerizable group-containing polymerization initiator represented by the formula (C-3) nor the bifunctional monomer represented by the formula (C-4) was introduced.

<High-Temperature Test on Backlight>

For the VATN-mode liquid crystal cells produced in Example 4 and Comparative Example 8, the same evaluation test as in Example 1 and other examples were performed. The results are shown in the following Table 4.

TABLE 4

| | Before test | | After 5000-hour test | |
|---|---|---|---|---|
| | VHR (%) | Contrast ratio | VHR (%) | Contrast ratio |
| Example 4 | 99.1 | 5000 | 98.6 | 4900 |
| Comparative Example 8 | 99.5 | 5000 | 96.4 | 4500 |

As shown in Table 4, the results of Example 4 demonstrate that the polymer layers formed by thermal polymerization using the polymerizable group-containing polymerization initiator represented by the formula (C-3) allowed the VHR and the contrast ratio to be maintained at high levels after the 5000-hour test in comparison with Comparative Example 8. Thus, even in the case of vertical alignment, the polymer layers seem to effectively reduce transfer of radicals generated in the cinnamate group-containing photo-alignment films to the negative liquid crystal material, consequently reducing decreases in VHR and contrast ratio.

ADDITIONAL REMARKS

One aspect of the present invention may be a liquid crystal display device including: paired substrates; a liquid crystal layer disposed between the substrates; a photo-alignment film disposed between at least one of the substrates and the liquid crystal layer; and a polymer layer disposed between the liquid crystal layer and the photo-alignment film, the photo-alignment film containing a polymer that contains a photo-reactive functional group, the polymer layer containing a polymer that has a structure derived from a polymerization initiator represented by the following formula (1) and a structure derived from a monomer represented by the following formula (2),

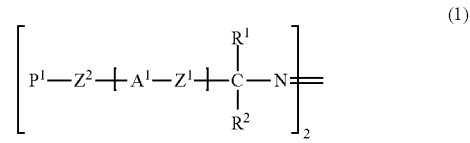

wherein $P^1$ is an acryloyloxy, methacryloyloxy, acryloylamino, methacryloylamino, vinyl, or vinyloxy group;

$Z^1$ and $Z^2$ are the same as or different from each other, and are each a —O—, —S—, —NH—, —CO—, —COO—, —OCO—, —NHCO—, —CONH—, —CH$_2$—, —CH(CH$_3$)—, —C(CH$_3$)$_2$—, —CF$_2$—, —C(OH)CO(CO)—, or —C(OH)C(HN)— group, or a direct bond;

$R^1$ and $R^2$ are the same as or different from each other, and are each a —H, —CH$_3$, —C$_2$H$_5$, —C$_3$H$_7$, —X (X is a halogen), —CN, —NH$_2$, —NH(CH$_3$), —N(CH$_3$)$_2$, —OH, —OCH$_3$, —OC$_2$H$_5$, or —OC$_3$H$_7$ group;

$A^1$ is a 1,4-phenylene, naphthalene-2,6-diyl, 1,4-cyclohexylene, or C1-C18 saturated or unsaturated alkylene group;

a —CH₂— group in A¹ may be replaced by a —O— group or a —S— group unless neighboring another one;

at least one hydrogen atom in A¹ may be replaced by a fluorine atom, a chlorine atom, a —CN group, or a C1-C6 alkyl, alkoxy, alkylcarbonyl, alkoxycarbonyl, or alkylcarbonyloxy group;

n is 0, 1, or 2; and when n is 2, the two A¹s on the same side of the azo group may be the same as or different from each other, and the two Z¹s on the same side of the azo group may be the same as or different from each other,

[Chem. 43]

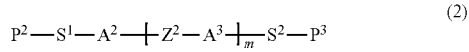

(2)

wherein P² and P³ are the same as or different from each other, and are each an acryloyloxy, methacryloyloxy, acryloylamino, methacryloylamino, vinyl, or vinyloxy group;

A² and A³ are the same as or different from each other, and are each a 1,4-phenylene, 4,4'-biphenyl, naphthalene-2,6-diyl, anthracene 2,6-diyl, or phenanthrene-2,7-diyl group;

Z² is a —COO—, —OCO—, —O—, —CO—, —NHCO—, —CONH—, or —S— group, or represents a direct bond between A² and A³ or between A³ and A³;

m is 0, 1, or 2;

S¹ and S² are the same as or different from each other, and are each $(CH_2)_j$ (1≤j≤18) or $(CH_2—CH_2—O)_k$ (1≤k≤6), or represents a direct bond between P² and A², between A² and P³, or between A³ and P³; and at least one hydrogen atom in A² and A³ may be replaced by a halogen, methyl, or ethyl group.

The liquid crystal display device of the above aspect includes a photo-alignment film containing a polymer that contains a photo-reactive functional group, and further includes a polymer layer containing a polymer that has a structure derived from a polymerization initiator represented by the formula (1) and a structure derived from a monomer represented by the formula (2) between the liquid crystal layer and the photo-alignment film. This can reduce transfer of radicals to liquid crystal molecules and generation itself of radicals. As a result, the liquid crystal display device is capable of maintaining a favorable voltage holding ratio and reducing occurrence of image sticking and stain and a decrease in contrast ratio in a high-temperature environment for a long time.

The photo-reactive functional group may be an azobenzene, chalcone, or cinnamate group. This embodiment can more effectively provide an effect of reducing dissolution of radicals in the liquid crystal layer.

The polymer contained in the photo-alignment film may be a polyamic acid, a polyimide, a polysiloxane, a polyvinyl, or polymaleimide.

The polymer contained in the photo-alignment film may be coupled with the polymer contained in the polymer layer. This embodiment can reduce dissolution of the polymer contained in the photo-alignment film in the liquid crystal layer and further improve the long-term reliability of the liquid crystal display device.

The photo-alignment film may substantially horizontally align liquid crystal molecules in the liquid crystal layer. This embodiment can effectively provide an effect of reducing dissolution of radicals in the liquid crystal layer. In this embodiment, many radicals are easily generated. Still, the polymer layer can also effectively reduce dissolution of these many radicals.

The photo-alignment film may substantially vertically align liquid crystal molecules in the liquid crystal layer. This embodiment can effectively provide an effect of reducing dissolution of radicals in the liquid crystal layer.

The liquid crystal layer may contain a liquid crystal material having negative anisotropy of dielectric constant. This embodiment can more effectively reduce occurrence of image sticking and stain.

The alignment mode of the liquid crystal display device may be the twisted nematic (TN), electrically controlled birefringence (ECB), in-plane switching (IPS), fringe field switching (FFS), vertical alignment (VA), or twisted nematic vertical alignment (VATN) mode.

Another aspect of the present invention relates to a method for manufacturing a liquid crystal display device, including: preparing paired substrates; forming a photo-alignment film containing a polymer that contains a photo-reactive functional group on at least one of the substrates; forming a liquid crystal layer between the substrates at least one of which is provided with the photo-alignment film; and thermally polymerizing a monomer represented by the following formula (2) using a polymerization initiator represented by the following formula (1) to form a polymer layer between the photo-alignment film and the liquid crystal layer,

[Chem. 44]

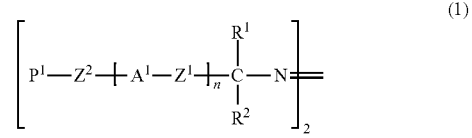

(1)

wherein P¹ is an acryloyloxy, methacryloyloxy, acryloylamino, methacryloylamino, vinyl, or vinyloxy group;

Z¹ and Z² are the same as or different from each other, and are each a —O—, —S—, —NH—, —CO—, —COO—, —OCO—, —NHCO—, —CONH—, —CH₂—, —CH(CH₃)—, —C(CH₃)₂—, —CF₂—, —C(OH)CO(CO)—, or —C(OH)C(HN)— group, or a direct bond;

R¹ and R² are the same as or different from each other, and are each a —H, —CH₃, —C₂H₅, —C₃H₇, —X (X is a halogen), —CN, —NH₂, —NH(CH₃), —N(CH₃) 2, —OH, —OCH₃, —OC₂H₅, or —OC₃H₇ group;

A¹ is a 1,4-phenylene, naphthalene-2,6-diyl, 1,4-cyclohexylene, or C1-C18 saturated or unsaturated alkylene group;

a —CH₂— group in A¹ may be replaced by a —O— group or a —S— group unless neighboring another one;

at least one hydrogen atom in A¹ may be replaced by a fluorine atom, a chlorine atom, a —CN group, or a C1-C6 alkyl, alkoxy, alkylcarbonyl, alkoxycarbonyl, or alkylcarbonyloxy group;

n is 0, 1, or 2; and when n is 2, the two A¹s on the same side of the azo group may be the same as or different from each other, and the two Z¹s on the same side of the azo group may be the same as or different from each other,

[Chem. 45]

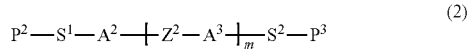

(2)

wherein P² and P³ are the same as or different from each other, and are each an acryloyloxy, methacryloyloxy, acryloylamino, methacryloylamino, vinyl, or vinyloxy group;

A² and A³ are the same as or different from each other, and are each a 1,4-phenylene, 4,4'-biphenyl, naphthalene-2,6-diyl, anthracene 2,6-diyl, or phenanthrene-2,7-diyl group;

$Z^2$ is a —COO—, —OCO—, —O—, —CO—, —NHCO—, —CONH—, or —S— group, or represents a direct bond between A² and A³ or between A³ and A³;

m is 0, 1, or 2;

S¹ and S² are the same as or different from each other, and are each $(CH_2)_j$ ($1<j\leq18$) or $(CH_2-CH_2-O)_k$ ($1\leq k\leq6$), or represents a direct bond between P² and A² between A² and P³, or between A³ and P³; and at least one hydrogen atom in A² and A³ may be replaced by a halogen, methyl, or ethyl group.

The method for manufacturing a liquid crystal display device of the above aspect includes forming a photo-alignment film containing a polymer that contains a photo-reactive functional group, and further includes thermally polymerizing a monomer represented by the formula (2) using a polymerization initiator represented by the formula (1) to form a polymer layer between the photo-alignment film and the liquid crystal layer. This can reduce transfer of radicals to liquid crystal molecules and generation itself of radicals. As a result, the method can provide a liquid crystal display device that is capable of maintaining a favorable voltage holding ratio and reducing occurrence of image sticking and stain and a decrease in contrast ratio in a high-temperature environment for a long time.

The thermal polymerization may be performed at a temperature that is not lower than the radical-generating temperature of the polymerization initiator but lower than the nematic-isotropic transition temperature of a liquid crystal material in the liquid crystal layer.

In forming the photo-alignment film, the photo-alignment film may be irradiated with polarized ultraviolet light. This enables easy and highly precise control of the azimuth and pre-tilt angle of the liquid crystal alignment.

The photo-reactive functional group may be an azobenzene, chalcone, or cinnamate group. This embodiment can more effectively provide an effect of reducing dissolution of radicals in the liquid crystal layer.

The polymer contained in the photo-alignment film may be a polyamic acid, a polyimide, a polysiloxane, a polyvinyl, or polymaleimide.

The polymer contained in the photo-alignment film and the polymer contained in the polymer layer may be coupled with each other by photo-irradiation and/or heat. This embodiment can reduce dissolution of the polymer contained in the photo-alignment film in the liquid crystal layer and further improve the long-term reliability of the liquid crystal display device.

The photo-alignment film may substantially horizontally align liquid crystal molecules in the liquid crystal layer by polarized light irradiation.

The photo-alignment film may substantially vertically align liquid crystal molecules in the liquid crystal layer by polarized light irradiation.

The liquid crystal layer may contain a liquid crystal material having negative anisotropy of dielectric constant. This embodiment can more effectively reduce occurrence of image sticking and stain.

The alignment mode of the liquid crystal display device may be the twisted nematic (TN), electrically controlled birefringence (ECB), in-plane switching (IPS), fringe field switching (FFS), vertical alignment (VA), or twisted nematic vertical alignment (VATN) mode.

The embodiments of the present invention described above may appropriately be combined within the spirit of the present invention.

REFERENCE SIGNS LIST

10, 20: substrate
30: liquid crystal layer
31: radical scavenger
40: photo-alignment film
50: polymer layer
60: seal
70: polarizer
80: backlight

The invention claimed is:

1. A liquid crystal display device comprising:
   paired substrates;
   a liquid crystal layer disposed between the substrates;
   a photo-alignment film disposed between at least one of the substrates and the liquid crystal layer; and
   a polymer layer disposed between the liquid crystal layer and the photo-alignment film,
   the photo-alignment film containing a polymer that contains a photo-reactive functional group,
   the polymer layer containing a polymer that has a structure derived from a polymerization initiator represented by the following formula (1) and a structure derived from a monomer represented by the following formula (2),

[Chem. 1]

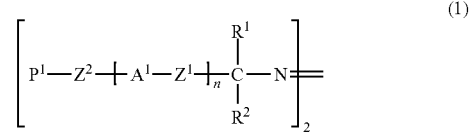

(1)

wherein P¹ is an acryloyloxy, methacryloyloxy, acryloylamino, methacryloylamino, vinyl, or vinyloxy group;

$Z^1$ and $Z^2$ are the same as or different from each other, and are each a —O—, —S—, —NH—, —CO—, —COO—, —OCO—, —NHCO—, —CONH—, —CH₂—, —CH(CH₃)—, —C(CH₃)₂—, —CF₂—, —C(OH)CO(CO)—, or —C(OH)C(HN)— group, or a direct bond;

R¹ and R² are the same as or different from each other, and are each a —H, —CH₃, —C₂H₅, —C₃H₇, —X (X is a halogen), —CN, —NH₂, —NH(CH₃), —N(CH₃)₂, —OH, —OCH₃, —OC₂H₅, or —OC₃H, group;

A¹ is a 1,4-phenylene, naphthalene-2,6-diyl, 1,4-cyclohexylene, or C1-C18 saturated or unsaturated alkylene group;

a —CH₂— group in A¹ may be replaced by a —O— group or a —S— group unless neighboring another one;

at least one hydrogen atom in $A^1$ may be replaced by a fluorine atom, a chlorine atom, a —CN group, or a C1-C6 alkyl, alkoxy, alkylcarbonyl, alkoxycarbonyl, or alkylcarbonyloxy group;

n is 0, 1, or 2; and when n is 2, the two A's on the same side of the azo group may be the same as or different from each other, and the two $Z^1$s on the same side of the azo group may be the same as or different from each other,

[Chem. 2]

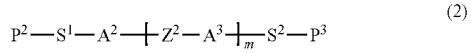

(2)

wherein $P^2$ and $P^3$ are the same as or different from each other, and are each an acryloyloxy, methacryloyloxy, acryloylamino, methacryloylamino, vinyl, or vinyloxy group;

$A^2$ and $A^3$ are the same as or different from each other, and are each a 1,4-phenylene, 4,4'-biphenyl, naphthalene-2,6-diyl, anthracene 2,6-diyl, or phenanthrene-2,7-diyl group;

$Z^2$ is a —COO—, —OCO—, —O—, —CO—, —NHCO—, —CONH—, or —S— group, or represents a direct bond between $A^2$ and $A^3$ or between $A^3$ and $A^3$;

m is 0, 1, or 2;

$S^1$ and $S^2$ are the same as or different from each other, and are each $(CH_2)_j$ (1≤j≤18), or $(CH_2—CH_2—O)_k$ (1≤k≤6), or represents a direct bond between $P^2$ and $A^2$, between $A^2$ and $P^3$, or between $A^3$ and $P^3$; and at least one hydrogen atom in $A^2$ and $A^3$ may be replaced by a halogen, methyl, or ethyl group.

2. The liquid crystal display device according to claim 1, wherein the photo-reactive functional group is an azobenzene, chalcone, or cinnamate group.

3. The liquid crystal display device according to claim 1, wherein the polymer contained in the photo-alignment film is a polyamic acid, a polyimide, a polysiloxane, a polyvinyl, or polymaleimide.

4. The liquid crystal display device according to claim 1, wherein the polymer contained in the photo-alignment film is coupled with the polymer contained in the polymer layer.

5. The liquid crystal display device according to claim 1, wherein the photo-alignment film substantially horizontally aligns liquid crystal molecules in the liquid crystal layer.

6. The liquid crystal display device according to claim 1, wherein the photo-alignment film substantially vertically aligns liquid crystal molecules in the liquid crystal layer.

7. The liquid crystal display device according to claim 1, wherein the liquid crystal layer contains a liquid crystal material having negative anisotropy of dielectric constant.

8. The liquid crystal display device according to claim 1, wherein the alignment mode of the liquid crystal display device is the twisted nematic (TN), electrically controlled birefringence (ECB), in-plane switching (IPS), fringe field switching (FFS), vertical alignment (VA), or twisted nematic vertical alignment (VATN) mode.

9. A method for manufacturing a liquid crystal display device, comprising:
preparing paired substrates;
forming a photo-alignment film containing a polymer that contains a photo-reactive functional group on at least one of the substrates;
forming a liquid crystal layer between the substrates at least one of which is provided with the photo-alignment film; and
thermally polymerizing a monomer represented by the following formula (2) using a polymerization initiator represented by the following formula (1) to form a polymer layer between the photo-alignment film and the liquid crystal layer,

[Chem. 3]

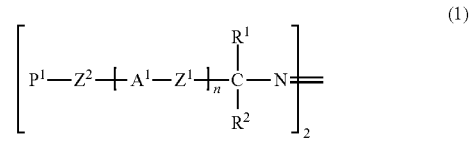

(1)

wherein $P^1$ is an acryloyloxy, methacryloyloxy, acryloylamino, methacryloylamino, vinyl, or vinyloxy group;

$Z^1$ and $Z^2$ are the same as or different from each other, and are each a —O—, —S—, —NH—, —CO—, —COO—, —OCO—, —NHCO—, —CONH—, —CH_2—, —CH(CH_3)—, —C(CH_3)_2—, —CF_2—, —C(OH)CO(CO)—, or —C(OH)C(HN)— group, or a direct bond;

$R^1$ and $R^2$ are the same as or different from each other, and are each a —H, —CH_3, —C_2H_5, —C_3H_7, —X (X is a halogen), —CN, —NH_2, —NH(CH_3), —N(CH_3)_2, —OH, —OCH_3, —OC_2H_5, or —OC_3H_7 group;

$A^1$ is a 1,4-phenylene, naphthalene-2,6-diyl, 1,4-cyclohexylene, or C1-C18 saturated or unsaturated alkylene group;

a —CH_2— group in $A^1$ may be replaced by a —O— group or a —S— group unless neighboring another one;

at least one hydrogen atom in $A^1$ may be replaced by a fluorine atom, a chlorine atom, a —CN group, or a C1-C6 alkyl, alkoxy, alkylcarbonyl, alkoxycarbonyl, or alkylcarbonyloxy group;

n is 0, 1, or 2; and when n is 2, the two A's on the same side of the azo group may be the same as or different from each other, and the two $Z^1$s on the same side of the azo group may be the same as or different from each other,

[Chem. 4]

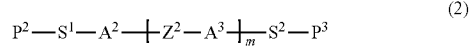

(2)

wherein $P^2$ and $P^3$ are the same as or different from each other, and are each an acryloyloxy, methacryloyloxy, acryloylamino, methacryloylamino, vinyl, or vinyloxy group;

$A^2$ and $A^3$ are the same as or different from each other, and are each a 1,4-phenylene, 4,4'-biphenyl, naphthalene-2,6-diyl, anthracene 2,6-diyl, or phenanthrene-2,7-diyl group;

$Z^2$ is a —COO—, —OCO—, —O—, —CO—, —NHCO—, —CONH—, or —S— group, or represents a direct bond between $A^2$ and $A^3$ or between $A^3$ and $A^3$;

m is 0, 1, or 2;

$S^1$ and $S^2$ are the same as or different from each other, and are each $(CH_2)_j$ (1≤j≤18), or $(CH_2—CH_2—O)_k$ ($1 \leq k \leq 6$), or represents a direct bond between $P^2$ and $A^2$, between $A^2$ and $P^3$, or between $A^3$ and $P^3$; and at least one hydrogen atom in $A^2$ and A3 may be replaced by a halogen, methyl, or ethyl group.

10. The method for manufacturing a liquid crystal display device according to claim 9, wherein the thermal polymerization is performed at a temperature that is not lower than the radical-generating temperature of the polymerization initiator but lower than the nematic-isotropic transition temperature of a liquid crystal material in the liquid crystal layer.

11. The method for manufacturing a liquid crystal display device according to claim 9, wherein in forming the photo-alignment film, the photo-alignment film is irradiated with polarized ultraviolet light.

12. The method for manufacturing a liquid crystal display device according to claim 9, wherein the photo-reactive functional group is an azobenzene, chalcone, or cinnamate group.

13. The method for manufacturing a liquid crystal display device according to claim 9, wherein the polymer contained in the photo-alignment film is a polyamic acid, a polyimide, a polysiloxane, a polyvinyl, or polymaleimide.

14. The method for manufacturing a liquid crystal display device according to claim 9, wherein the polymer contained in the photo-alignment film and the polymer contained in the polymer layer are coupled with each other by photo-irradiation and/or heat.

15. The method for manufacturing a liquid crystal display device according to claim 9, wherein the photo-alignment film substantially horizontally aligns liquid crystal molecules in the liquid crystal layer by polarized light irradiation.

16. The method for manufacturing a liquid crystal display device according to claim 9, wherein the photo-alignment film substantially vertically aligns liquid crystal molecules in the liquid crystal layer by polarized light irradiation.

17. The method for manufacturing a liquid crystal display device according to claim 9, wherein the liquid crystal layer contains a liquid crystal material having negative anisotropy of dielectric constant.

18. The method for manufacturing a liquid crystal display device according to claim 9, wherein the alignment mode of the liquid crystal display device is the twisted nematic (TN), electrically controlled birefringence (ECB), in-plane switching (IPS), fringe field switching (FFS), vertical alignment (VA), or twisted nematic vertical alignment (VATN) mode.

* * * * *